(12) United States Patent
Toshiyuki

(10) Patent No.: US 11,984,818 B2
(45) Date of Patent: May 14, 2024

(54) INVERTER CAPABLE OF OPERATING IN MULTIPLE STATES

(71) Applicant: DENSO CORPORATION, Kariya (JP)

(72) Inventor: Ken Toshiyuki, Toyota (JP)

(73) Assignee: DENSO CORPORATION, Kariya (JP)

( * ) Notice: Subject to any disclaimer, the term of this patent is extended or adjusted under 35 U.S.C. 154(b) by 216 days.

(21) Appl. No.: 17/681,922

(22) Filed: Feb. 28, 2022

(65) Prior Publication Data
US 2022/0181992 A1    Jun. 9, 2022

Related U.S. Application Data

(63) Continuation of application No. PCT/JP2019/033377, filed on Aug. 26, 2019.

(51) Int. Cl.
   *H02M 7/487*    (2007.01)
   *H02M 1/32*     (2007.01)
   *H02M 7/537*    (2006.01)

(52) U.S. Cl.
   CPC .......... *H02M 7/487* (2013.01); *H02M 1/325* (2021.05); *H02M 7/537* (2013.01)

(58) Field of Classification Search
   CPC ......... H02M 1/32; H02M 1/325; H02M 7/487
   See application file for complete search history.

(56) References Cited

U.S. PATENT DOCUMENTS

| | | | |
|---|---|---|---|
| 2004/0125523 A1 | 7/2004 | Edwards et al. | |
| 2005/0281065 A1* | 12/2005 | Nojima | H02H 7/1227 363/98 |
| 2008/0204959 A1* | 8/2008 | Knapp | H02M 7/487 361/100 |
| 2013/0148391 A1* | 6/2013 | Grbovic | H02M 7/487 363/56.01 |
| 2015/0346276 A1* | 12/2015 | Liu | H02M 7/487 324/750.3 |

(Continued)

FOREIGN PATENT DOCUMENTS

JP    2016-220325 A    12/2016

OTHER PUBLICATIONS

Oct. 8, 2019 Search Report issued in International Patent Application No. PCT/JP2019/033377.

*Primary Examiner* — Alex Torres-Rivera
(74) *Attorney, Agent, or Firm* — Oliff PLC

(57) ABSTRACT

In an inverter, three switching circuits each include first to fourth switching elements, first and second diodes, and a control circuit controlling potentials of gates. The control circuit causes potentials of U-, V-, and W-phase output wirings to change among high, neutral point, and low potentials. The control circuit performs an emergency operation when any of the second and third switching elements and the first and second diodes has caused a short fault. In the emergency operation, a potential of a limit output wiring is caused to change between two potentials that are not inhibiting potentials, and potentials of normal output wirings are caused to change among three potentials. When the short-fault element is the second switching element or the second diode, an inhibiting potential is the low potential. When the short-fault element is the third switching element or the first diode, the inhibiting potential is the high potential.

7 Claims, 18 Drawing Sheets

(56) References Cited

U.S. PATENT DOCUMENTS

| | | | |
|---|---|---|---|
| 2015/0349521 A1* | 12/2015 | Liu .................. | H02M 7/487 |
| | | | 361/93.1 |
| 2018/0109201 A1* | 4/2018 | Li .................... | F03D 17/00 |
| 2022/0085733 A1* | 3/2022 | Fukasawa ......... | H02M 7/537 |

* cited by examiner

| STATE | FIRST STATE | SECOND STATE | THIRD STATE |
|---|---|---|---|
| FIRST SWITCHING ELEMENT 41 | ON | OFF | OFF |
| SECOND SWITCHING ELEMENT 42 | ON | ON | OFF |
| THIRD SWITCHING ELEMENT 43 | OFF | ON | ON |
| FOURTH SWITCHING ELEMENT 44 | OFF | OFF | ON |
| POTENTIAL OF OUTPUT WIRING 60 | VH | VM | 0V |

| ELEMENT THAT HAS CAUSED SHORT FAULT | INHIBITING POTENTIAL |
|---|---|
| FIRST SWITCHING ELEMENT 41 | VM |
| SECOND SWITCHING ELEMENT 42 | 0V |
| THIRD SWITCHING ELEMENT 43 | VH |
| FOURTH SWITCHING ELEMENT 44 | VM |
| FIRST DIODE 51 | VH |
| SECOND DIODE 52 | 0V |

FIG.18

(TABLE 1 : FIRST RULE)

| | | DIRECTION OF CURRENT FLOWING TO LIMIT OUTPUT WIRING 60X | |
|---|---|---|---|
| | | FORWARD DIRECTION | REVERSE DIRECTION |
| ANGLE $\theta$ OF COMMAND VALUE VECTOR | LIMITED ANGULAR RANGE | ZERO VECTOR | ALLOWABLE VECTOR |
| | NORMAL ANGULAR RANGE | LOWER SIDE VECTOR | UPPER SIDE VECTOR |

(TABLE 2 : SECOND RULE)

| | | DIRECTION OF CURRENT FLOWING TO LIMIT OUTPUT WIRING 60X | |
|---|---|---|---|
| | | FORWARD DIRECTION | REVERSE DIRECTION |
| ANGLE $\theta$ OF COMMAND VALUE VECTOR | LIMITED ANGULAR RANGE | ALLOWABLE VECTOR | ALLOWABLE VECTOR |
| | NORMAL ANGULAR RANGE | LOWER SIDE VECTOR | UPPER SIDE VECTOR |

(TABLE 3 : THIRD RULE)

| | | DIRECTION OF CURRENT FLOWING TO LIMIT OUTPUT WIRING 60X | |
|---|---|---|---|
| | | FORWARD DIRECTION | REVERSE DIRECTION |
| ANGLE $\theta$ OF COMMAND VALUE VECTOR | LIMITED ANGULAR RANGE | ALLOWABLE VECTOR | ALLOWABLE VECTOR |
| | NORMAL ANGULAR RANGE | UPPER SIDE VECTOR | LOWER SIDE VECTOR |

(TABLE 4 : FOURTH RULE)

| | | DIRECTION OF CURRENT FLOWING TO LIMIT OUTPUT WIRING 60X | |
|---|---|---|---|
| | | FORWARD DIRECTION | REVERSE DIRECTION |
| ANGLE $\theta$ OF COMMAND VALUE VECTOR | LIMITED ANGULAR RANGE | ALLOWABLE VECTOR | ZERO VECTOR |
| | NORMAL ANGULAR RANGE | UPPER SIDE VECTOR | LOWER SIDE VECTOR |

FIG.22

(TABLE 5 : FIFTH RULE)

| | | DIRECTION OF CURRENT FLOWING TO LIMIT OUTPUT WIRING 60X | |
|---|---|---|---|
| | | FORWARD DIRECTION | REVERSE DIRECTION |
| ANGLE $\theta$ OF COMMAND VALUE VECTOR | LIMITED ANGULAR RANGE | ALLOWABLE VECTOR | ZERO VECTOR |
| | NORMAL ANGULAR RANGE | LOWER SIDE VECTOR | UPPER SIDE VECTOR |

(TABLE 6 : SIXTH RULE)

| | | DIRECTION OF CURRENT FLOWING TO LIMIT OUTPUT WIRING 60X | |
|---|---|---|---|
| | | FORWARD DIRECTION | REVERSE DIRECTION |
| ANGLE $\theta$ OF COMMAND VALUE VECTOR | LIMITED ANGULAR RANGE | ALLOWABLE VECTOR | ALLOWABLE VECTOR |
| | NORMAL ANGULAR RANGE | LOWER SIDE VECTOR | UPPER SIDE VECTOR |

(TABLE 7 : SEVENTH RULE)

| | | DIRECTION OF CURRENT FLOWING TO LIMIT OUTPUT WIRING 60X | |
|---|---|---|---|
| | | FORWARD DIRECTION | REVERSE DIRECTION |
| ANGLE $\theta$ OF COMMAND VALUE VECTOR | LIMITED ANGULAR RANGE | ALLOWABLE VECTOR | ALLOWABLE VECTOR |
| | NORMAL ANGULAR RANGE | UPPER SIDE VECTOR | LOWER SIDE VECTOR |

(TABLE 8 : EIGHTH RULE)

| | | DIRECTION OF CURRENT FLOWING TO LIMIT OUTPUT WIRING 60X | |
|---|---|---|---|
| | | FORWARD DIRECTION | REVERSE DIRECTION |
| ANGLE $\theta$ OF COMMAND VALUE VECTOR | LIMITED ANGULAR RANGE | ZERO VECTOR | ALLOWABLE VECTOR |
| | NORMAL ANGULAR RANGE | LOWER SIDE VECTOR | UPPER SIDE VECTOR |

INVERTER CAPABLE OF OPERATING IN MULTIPLE STATES

CROSS-REFERENCE TO RELATED APPLICATION

The present application is based on and claims the benefit of priority from earlier International Application No. PCT/JP2019/033377 filed Aug. 26, 2019, the description of which is incorporated herein by reference.

BACKGROUND

Technical Field

The present disclosure relates to an inverter.

Related Art

An inverter that can change an output potential in three levels is disclosed.

SUMMARY

An aspect of the present disclosure provides an inverter, including: a high potential wiring to which a high potential is applied; a low potential wiring to which a low potential is applied; a neutral point; an upper side capacitor connected between the high potential wiring and the neutral point; a lower side capacitor connected between the neutral point and the low potential wiring; and three switching circuits including a U-phase switching circuit, a V-phase switching circuit, and a W-phase switching circuit.

Each of the three switching circuits includes: an output wiring; a first switching element having a positive electrode connected to the high potential wiring; a second switching element having a positive electrode connected to a negative electrode of the first switching element and a negative electrode connected to the output wiring; a third switching element having a positive electrode connected to the output wiring; a fourth switching element having a positive electrode connected to a negative electrode of the third switching element and a negative electrode connected to the low potential wiring; a first diode having an anode connected to the neutral point and a cathode connected to the negative electrode of the first switching element; and a second diode having an anode connected to the negative electrode of the third switching element and a cathode connected to the neutral point.

The inverter further includes a control circuit controlling potentials of gates of the first switching element, the second switching element, the third switching element, and the fourth switching element of the three switching circuits.

The control circuit causes the three switching circuits to change among a first state in which the first switching element and the second switching element are turned on to apply the high potential to the corresponding output wiring, a second state in which the second switching element and the third switching element are turned on to apply a neutral point potential, which is a potential of the neutral point, to the corresponding output wiring, and a third state in which the third switching element and the fourth switching element are turned on to apply the low potential to the corresponding output wiring.

The control circuit causes respective potentials of a U-phase output wiring that is the output wiring of the U-phase switching circuit, a V-phase output wiring that is the output wiring of the V-phase switching circuit, and a W-phase output wiring that is the output wiring of the W-phase switching circuit to change among the high potential, the neutral point potential, and the low potential, to generate a three-phase AC current among the U-phase output wiring, the V-phase output wiring, and the W-phase output wiring.

The control circuit is capable of performing an emergency operation when any of the second switching elements, the third switching elements, the first diodes, and the second diodes of the three switching circuits has caused a short fault.

The element having caused a short fault is a short fault element.

The output wiring of one of the three switching elements which includes the short fault element is a limit output wiring.

Each of the output wirings of two of the three switching elements which do not include the short fault element is a normal output wiring.

In the emergency operation, the control circuit causes a potential of the limit output wiring to change between two potentials that are included in a group including the high potential, the neutral point potential, and the low potential and are not inhibiting potentials, and causes potentials of the respective normal output wirings to change among three potentials that are included in the group including the high potential, the neutral point potential, and the low potential.

When the short fault element is the second switching element or the second diode, the inhibiting potential is the low potential.

When the short fault element is the third switching element or the first diode, the inhibiting potential is the high potential.

BRIEF DESCRIPTION OF THE DRAWINGS

In the accompanying drawings:

FIG. 18 is a table illustrating first to fourth rules;

FIG. 22 is a table illustrating fifth to eighth rules; and

DETAILED DESCRIPTION OF THE PREFERRED EMBODIMENTS

Figure 1:
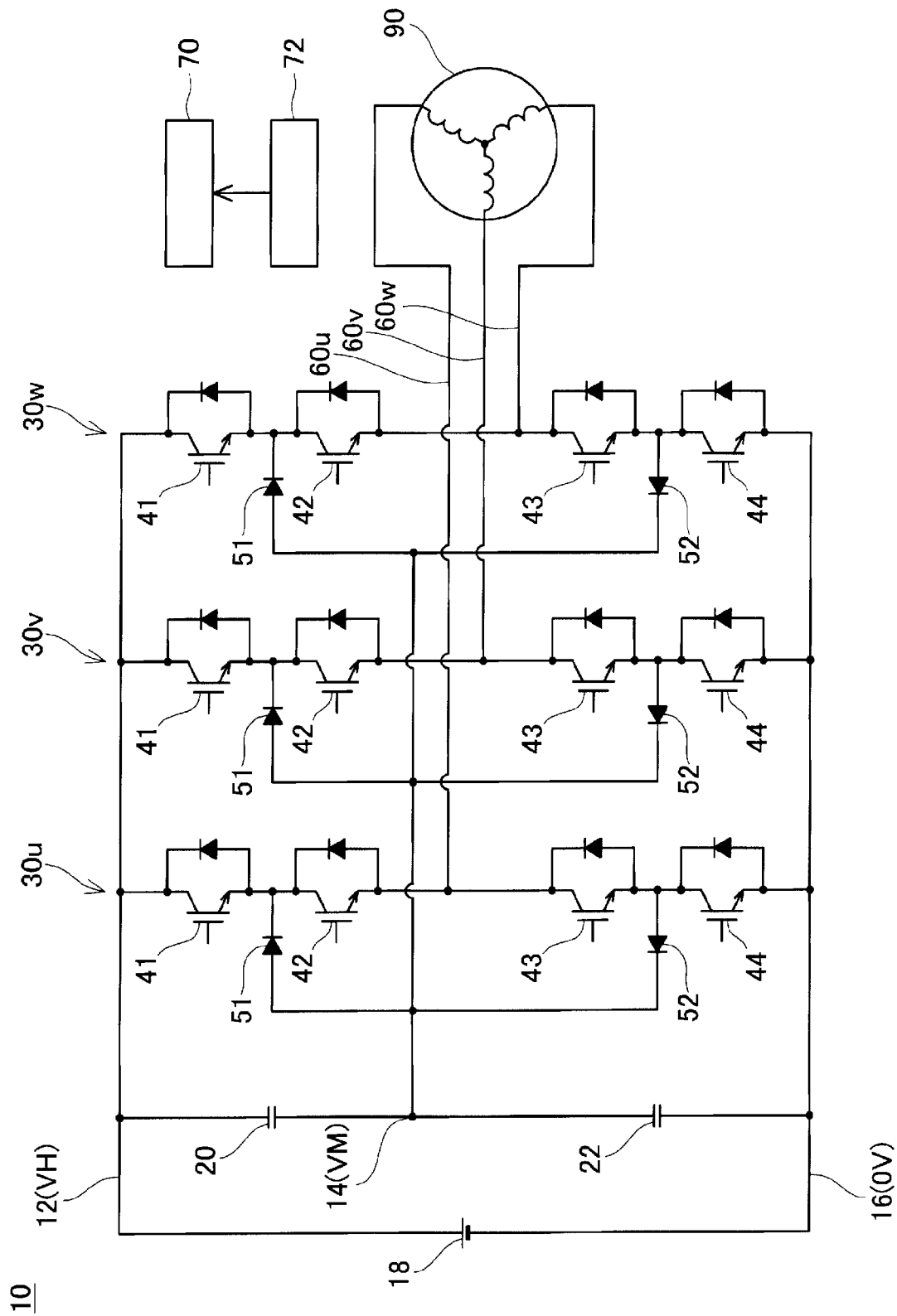
FIG. 1 is a circuit diagram of an inverter.

JP-A-2016-220325 discloses an inverter that can change an output potential in three levels. The inverter has an upper side capacitor connected between a high potential wiring and a neutral point and a lower side capacitor connected between the neutral point and a low potential wiring. Hence, the potential of the neutral point is a potential between the high potential wiring and the low potential wiring. The inverter has switching circuits for respective three output wirings (U phase, V phase, W phase). Each of the switching circuits has four switching elements (first to four switching elements from the high potential wiring side) connected in series between the high potential wiring and the low potential wiring. An output wiring is connected between the negative electrode of the second switching element and the positive electrode of the third switching element. Each of the switching circuits has a first diode and a second diode. The anode of the first diode is connected to the neutral point. The cathode of the first diode is connected to the negative electrode of the first switching element. The anode of the second diode is connected to the negative electrode of the third switching element. The cathode of the second diode is connected to the neutral point. In each of the switching circuits, if the first switching element and the second switching element are turned on, a high potential is applied to the output wiring. If the second switching element and the third switching element are turned on, a neutral point potential is applied to the output wiring. If the third switching element and the fourth switching element are turned on, a low potential is applied to the output wiring. Change in the potential of each of the output wirings in three levels generates a three-phase AC current among the output wirings.

Any of the switching elements and the diodes configuring the switching circuits may cause a short fault. In this case, the switching element having an element that has caused a short fault cannot output a specific potential to the output wirings. For example, in a case where in which the first switching element has caused a short fault, if the second switching element and the third switching element are turned on, a line-to-line short circuit occurs between the high potential wiring and the neutral point. Hence, in this case, the switching circuit cannot output a neutral point potential to the output wirings. Similarly, if the second switching element causes a short fault, the switching circuit cannot output a low potential to the output wirings. If the third switching element causes a short fault, the switching circuit cannot output a high potential to the output wirings. If the fourth switching element causes a neutral point potential, the switching circuit cannot output a neutral point potential to the output wirings. If the first diode causes a short fault, the switching circuit cannot output a high potential to the output wirings. If the second diode causes a short fault, the switching circuit cannot output a low potential to the output wirings.

Even when an element has caused a short fault, a certain inverter may be required to generate a three-phase AC current. In such a case, it can be considered that a potential that cannot be output is inhibited, and a potential of each output wiring is changed between the remaining two potentials.

As described above, if the first switching element or the fourth switching element causes a short fault, a neutral point potential cannot be output to the output wirings. In this case, potentials of the three output wirings can be changed between a high potential and a low potential to generate a three-phase AC current. In this case, the inverter can continuously generate a three-phase AC current.

As described above, if the second switching element or the second diode causes a short fault, a low potential cannot be output to the output wirings. In this case, potentials of the three output wirings can be changed between a high potential and a neutral point potential to generate a three-phase AC current. However, the inverter cannot continuously generate a three-phase AC current. That is, in this operation, since electric charge stored in the upper side capacitor is continuously used, the amount of the electric charge in the upper side capacitor becomes extremely low after a certain period of time, whereby the neutral point potential becomes extremely high. If the neutral point potential becomes extremely high, a three-phase AC current cannot be appropriately generated.

As described above, if the third switching element or the first diode causes a short fault, a high potential cannot be output to the output wirings. In this case, potentials of the three output wirings can be changed between a neutral point potential and a low potential to generate a three-phase AC current. However, the inverter cannot continuously generate a three-phase AC current. That is, in this operation, since electric charge stored in the lower side capacitor is continuously used, the amount of the electric charge in the lower side capacitor becomes extremely low after a certain period of time, whereby the neutral point potential becomes extremely low. If the neutral point potential becomes extremely low, a three-phase AC current cannot be appropriately generated.

According to the technique described above, when the second switching element, the third switching element, the first diode, or the second diode has caused a short fault, a three-phase AC current cannot be continuously generated. The present disclosure provides an inverter that can continuously generate a three-phase AC current in such a case First embodiment (Configuration of Inverter)

FIG. 1 is a circuit diagram of an inverter 10 of a first embodiment. The inverter 10 is installed in a vehicle. In the vehicle, a battery 18 and a traction motor 90 are installed. The traction motor 90 is a three-phase motor. The inverter 10 is connected to the battery 18 and the traction motor 90. The inverter 10 converts DC power applied from the battery 18 into three-phase AC power and supplies the three-phase AC power to the traction motor 90. Thus, the traction motor 90 is driven, whereby the vehicle travels.

The inverter 10 includes a high potential wiring 12, a neutral point 14, a low potential wiring 16, an upper side capacitor 20, and a lower side capacitor 22. The high potential wiring 12 is connected to the positive electrode of the battery 18. The low potential wiring 16 is connected to the negative electrode of the battery 18. Hereinafter, the potential of the low potential wiring 16 is defined as a reference potential (0V). The battery 18 apples DC voltage between the high potential wiring 12 and the low potential wiring 16. Hence, the high potential wiring 12 has a potential VH higher than the potential (0V) of the low potential wiring 16. The upper side capacitor 20 is connected between the high potential wiring 12 and the neutral point 14. The lower side capacitor 22 is connected between the neutral point 14 and the low potential wiring 16. Hence, a potential VM of the neutral point 14 (hereinafter, referred to as a neutral point potential VM) is higher than the potential (0V) of the low potential wiring 16 and lower than the potential VH of the high potential wiring 12. The neutral point potential VM changes depending on the amount of charge stored in the upper side capacitor 20 and the amount of charge stored in the lower side capacitor 22. If the upper side capacitor 20 is discharged or the lower side capacitor 22 is charged, the neutral point potential VM increases. If the upper side capacitor 20 is charged or the lower side capacitor 22 is discharged, the neutral point potential VM decreases.

The inverter 10 has three switching circuits 30, that is, a U-phase switching circuit 30u, a V-phase switching circuit 30v, and a W-phase switching circuit 30w. Each of the switching circuits 30 is connected among the high potential wiring 12, the low potential wiring 16, and the neutral point 14. Each of the switching circuits 30 has a first switching element 41, a second switching element 42, a third switching element 43, a fourth switching element 44, a first diode 51, a second diode 52, and an output wiring 60. Since configurations of the three switching circuits 30 are the same, hereinafter, the configuration of one switching circuit 30 will be described.

The switching elements 41 to 44 are configured by IGBTs (insulated gate bipolar transistors). The switching elements 41 to 44 may be configured by other elements (e.g., FETs (field effect transistors)). The switching elements 41 to 44 are respectively connected with free wheel diodes in parallel. The anode of the free wheel diode is connected to the emitter of the corresponding switching element. The cathode of the free wheel diode is connected to the collector of the corresponding switching element. The switching elements 41 to 44 are connected in series between the high potential wiring 12 and the low potential wiring 16. That is, the collector of the first switching element 41 is connected to the high potential wiring 12. The collector of the second switching element 42 is connected to the emitter of the first switching element 41. The collector of the third switching element 43 is connected to the emitter of the second switching element 42. The collector of the fourth switching element 44 is connected to the emitter of the third switching element 43. The emitter of the fourth switching element 44 is connected to the low potential wiring 16. The anode of the first diode 51 is connected to the neutral point 14. The cathode of the first diode 51 is connected to the emitter of the first switching element 41 and the collector of the second switching element 42. The anode of the second diode 52 is connected to the emitter of the third switching element 43 and the collector of the fourth switching element 44. The cathode of the second diode 52 is connected to the neutral point 14. One end of the output wiring 60 is connected to the emitter of the second switching element 42 and the collector of the third switching element 43. The other end of the output wiring 60 is connected to the traction motor 90.

Hereinafter, the output wiring 60 of the U-phase switching circuit 30u is referred to as a U-phase output wiring 60u. The output wiring 60 of the v-phase switching circuit 30v is referred to as a v-phase output wiring 60v. The output wiring 60 of the W-phase switching circuit 30w is referred to as a W-phase output wiring 60w. The U-phase output wiring 60u, the v-phase output wiring 60v, and the W-phase output wiring 60w are connected to the traction motor 90.

The inverter 10 has a control circuit 70 and a command circuit 72. The command circuit 72 generates a command value according to an operating state of the traction motor 90 and outputs the generated command value to the control circuit 70. Although not shown, the control circuit 70 is connected to the gates of the switching elements 41 to 44 of the U-phase switching circuit 30u, the v-phase switching circuit 30v, and the W-phase output wiring 30w. That is, the control circuit 70 is connected to the gates of the twelve switching elements shown in FIG. 1. The control circuit 70 turns on or off the switching elements based on command values received from the command circuit 72. Thus, a three-phase AC current is generated among the three output wirings 60. Supplying the three-phase AC current to the traction motor 90 drives the traction motor 90, whereby the vehicle travels.

Although not shown, the control circuit 70 and the command circuit 72 are connected to the neutral point 14. The control circuit 70 and the command circuit 72 can detect the neutral point potential VM.

Although not shown, the inverter 10 has current sensors that detect currents flowing through the respective output wirings 60. Detection values of the current sensors are output to the control circuit 70.

(Potentials of Output Wirings)

Next, potentials applied to the respective output wirings 60 will be described. The control circuit 70 controls the switching circuits 30 in any of a first state, a second state, and a third state shown in FIG. 2.

In the first state, control is performed to turn on the first switching element 41, turn on the second switching element 42, turn off the third switching element 43, and turn off the fourth switching element 44. In the first state, the output wiring 60 is connected to the high potential wiring 12 via the first switching element 41 and the second switching element 42. Hence, in the first state, the potential of the output wiring 60 is the same potential VH as that of the high potential wiring 12.

In the second state, control is performed to turn off the first switching element 41, turn on the second switching element 42, turn on the third switching element 43, and turn off the fourth switching element 44. In the second state, the output wiring 60 is connected to the neutral point 14 via the second switching element 42 and the first diode 51, or via the third switching element 43 and the second diode 52. Hence, in the second state, the potential of the output wiring 60 is the same potential VM as that of the output wiring 60.

In the third state, control is performed to turn off the first switching element 41, turn off the second switching element 42, turn on the third switching element 43, and turn on the fourth switching element 44. In the third state, the output wiring 60 is connected to the low potential wiring 16 via the third switching element 43 and the fourth switching element

44. Hence, in the third state, the potential of the output wiring 60 is the same potential 0V as that of the low potential wiring 16.

Since the state of each of the switching circuits 30 changes among the first state, the second state, and the third state, a potential of each of the output wirings 60 changes among the potential VH, the neutral point potential VM, and 0V. The control circuit 70 controls potentials of the output wirings 60 to cause the output wirings 60 to generate a three-phase AC current.

(Voltage Vector)

Figures 2, 3:
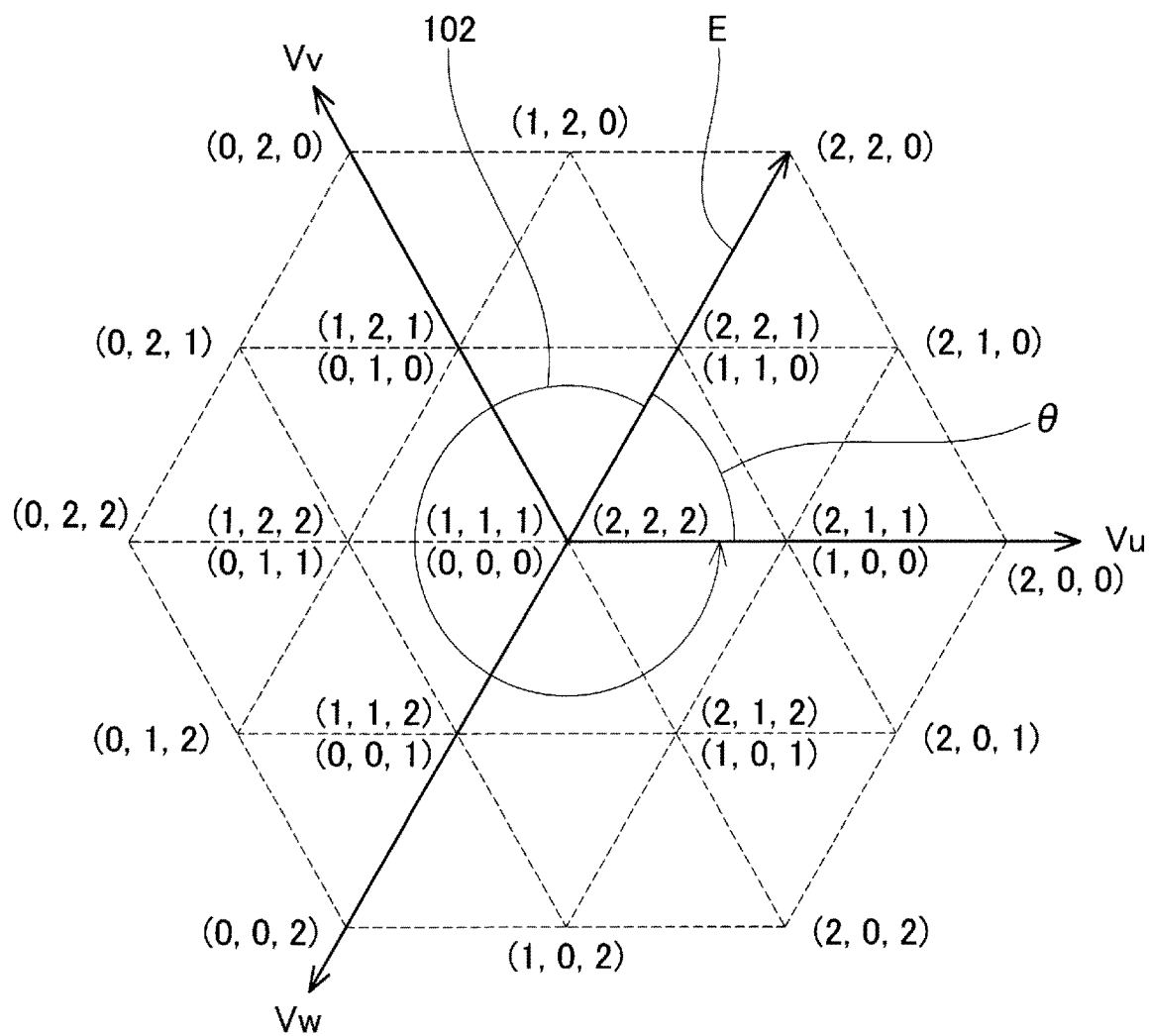
FIG. 2 is a table illustrating first to third states.
FIG. 3 is a space vector diagram illustrating a voltage vector.

FIG. 3 is a space vector diagram illustrating a voltage vector indicating potentials applied to the respective output wirings 60. FIG. 3 exemplifies a voltage vector E. The voltage vector is represented by three parameters (Vu, Vv, Vw). The parameter Vu indicates a potential of the U-phase output wiring 60*u*. The parameter Vv indicates a potential of the V-phase output wiring 60*v*. The parameter Vw indicates a potential of the W-phase output wiring 60*w*. The parameters Vu, Vv, Vw have values between 0 and 2. Value 0 indicates that 0V is applied to the corresponding output wiring 60. Value 1 indicates that the neutral point potential VM is applied to the corresponding output wiring 60. Value 2 indicates that the potential VH is applied to the corresponding output wirings 60. For example, since the voltage vector E exemplified in FIG. 3 is (2, 2, 0), it is meant that the potential VH is applied to the U-phase output wiring 60*u*, the potential VH is applied to the V-phase output wiring 60*v*, and 0V is applied to the W-phase output wiring 60*w*.

The command circuit 72 generates a command value of potentials to be applied to the three output wirings 60. The command circuit 72 generates the command value with a voltage vector (i.e., three parameters (Vu, Vv, Vw). The command value generated by the command circuit 72 is output to the control circuit 70. Hereinafter, the command value (voltage vector) output from the command circuit 72 to the control circuit 70 is referred to as a command value vector.

In normal operation, the control circuit 70 controls the inverter 10 in accordance with the command value vector. For example, when the parameter Vu of the command value vector is 0, the control circuit 70 controls the U-phase switching circuit 30*u* in the third state to apply 0V to the U-phase output wiring 60*u*. When the parameter Vu of the command value vector is 1, the control circuit 70 controls the U-phase switching circuit 30*u* in the second state to apply the neutral point potential VM to the U-phase output wiring 60*u*. When the parameter Vu of the command value vector is 2, the control circuit 70 controls the U-phase switching circuit 30*u* in the first state to apply the potential VH to the U-phase output wiring 60*u*. When the parameter Vv of the command value vector is 0, the control circuit 70 controls the V-phase switching circuit 30*v* in the third state to apply 0V to the V-phase output wiring 60*v*. When the parameter Vv of the command value vector is 1, the control circuit 70 controls the V-phase switching circuit 30*v* in the second state to apply the neutral point potential VM to the V-phase output wiring 60*v*. When the parameter Vv of the command value vector is 2, the control circuit 70 controls the V-phase switching circuit 30*v* in the first state to apply the potential VH to the V-phase output wiring 60*v*. When the parameter Vw of the command value vector is 0, the control circuit 70 controls the W-phase switching circuit 30*w* in the third state to apply 0V to the W-phase output wiring 60*w*. When the parameter Vw of the command value vector is 1, the control circuit 70 controls the W-phase switching circuit 30*w* in the second state to apply the neutral point potential VM to the W-phase output wiring 60*w*. When the parameter Vw of the command value vector is 2, the control circuit 70 controls the W-phase switching circuit 30*w* in the first state to apply the potential VH to the W-phase output wiring 60*w*. Thus, in normal operation, the control circuit 70 controls potentials of the three output wirings 60 in accordance with the command value vector. Hereinafter, controlling potentials of the three output wirings 60 by the control circuit 70 in accordance with the command value vector may be referred to as "outputting the command value vector".

The command circuit 72 sequentially generates command value vectors so as to rotate as indicated by an arrow 102 and outputs the command value vectors to the control circuit 70. In normal operation, the control circuit 70 outputs a voltage vector in accordance with the received command value vector. Hence, the outputted voltage vector rotates as indicated by the arrow 102. Thus, a three-phase AC current is generated among the three output wirings 30, whereby a magnetic field generated inside the traction motor 90 rotates. Accordingly, the rotor of the traction motor 90 rotates.

Hereinafter, as shown in FIG. 3, an angle of the voltage vector is indicated by an angle θ with respect to the Vu axis. For example, the angle θ of (2, 2, 0) is 60°. Since the command value vector is represented by (Vu, Vv, Vw), the command value vector includes information on the angle θ.

At a specific angle θ, a plurality of voltage vectors are present. For example, as shown in FIG. 3, three voltage vectors (2, 2, 0), (2, 2, 1), (1, 1, 0) are present. If (2, 2, 0) is output, the traction motor 90 can be operated with high torque compared with cases in which (2, 2, 1), (1, 1, 0) are output. When the torque required for the traction motor 90 is high, the command circuit 72 sets (2, 2, 0) as the command value vector. When the torque required for the traction motor 90 is low, the command circuit 72 sets (2, 2, 1) or (1, 1, 0) as the command value vector. When (2, 2, 1) is output, the upper side capacitor 20 is charged or discharged. When (1, 1, 0) is output, the lower side capacitor 22 is charged or discharged. Hence, if (2, 2, 1) or (1, 1, 0) is output, the neutral point potential VM changes. The change in the neutral point potential VM will be described later in detail. The command circuit 72 detects the neutral point potential VM and selects (2, 2, 1) or (1, 1, 0) as the command value vector so that the neutral point potential VM is a target value (e.g., ½ of the potential VH). Thus, at an angle θ at which a plurality of voltage vectors are present, the command circuit 72 selects one voltage vector from the plurality of voltage vectors as the command value vector.

The command circuit 72 may generate a command value vector including decimal fractions as the parameters Vu, Vv, Vw. For example, a voltage vector Ea shown in FIG. 4 may be generated as the command value vector. In this case, the control circuit 70 outputs voltage vectors Eb, Ec, and Ed close to the voltage vector Ea with time differences. Thus, the voltage vectors Eb, Ec, and Ed are synthesized, and the voltage vector Ea is output. The voltage vector Eb is (2, 2, 1) or (1, 1, 0). The voltage vector Ec is (2, 1, 1) or (1, 0, 0). The voltage vector Ed is (2, 2, 2), (1, 1, 1), or (0, 0, 0). The voltage vector Ed is a so-called zero vector and means that potentials of the three output wirings 60 are the same. Thus, when a command value vector including decimal fractions as parameters is generated, the control circuit 70 synthesizes and outputs the plurality of voltage vectors.

As described above, in normal operation, the command circuit 72 rotates a command value vector. Since the control circuit 70 controls the switching circuits 30*u*, 30*v*, 30*w* in accordance with the command value vector, a three-phase AC current is generated to the three output wirings 60. FIG.

Figure 5:
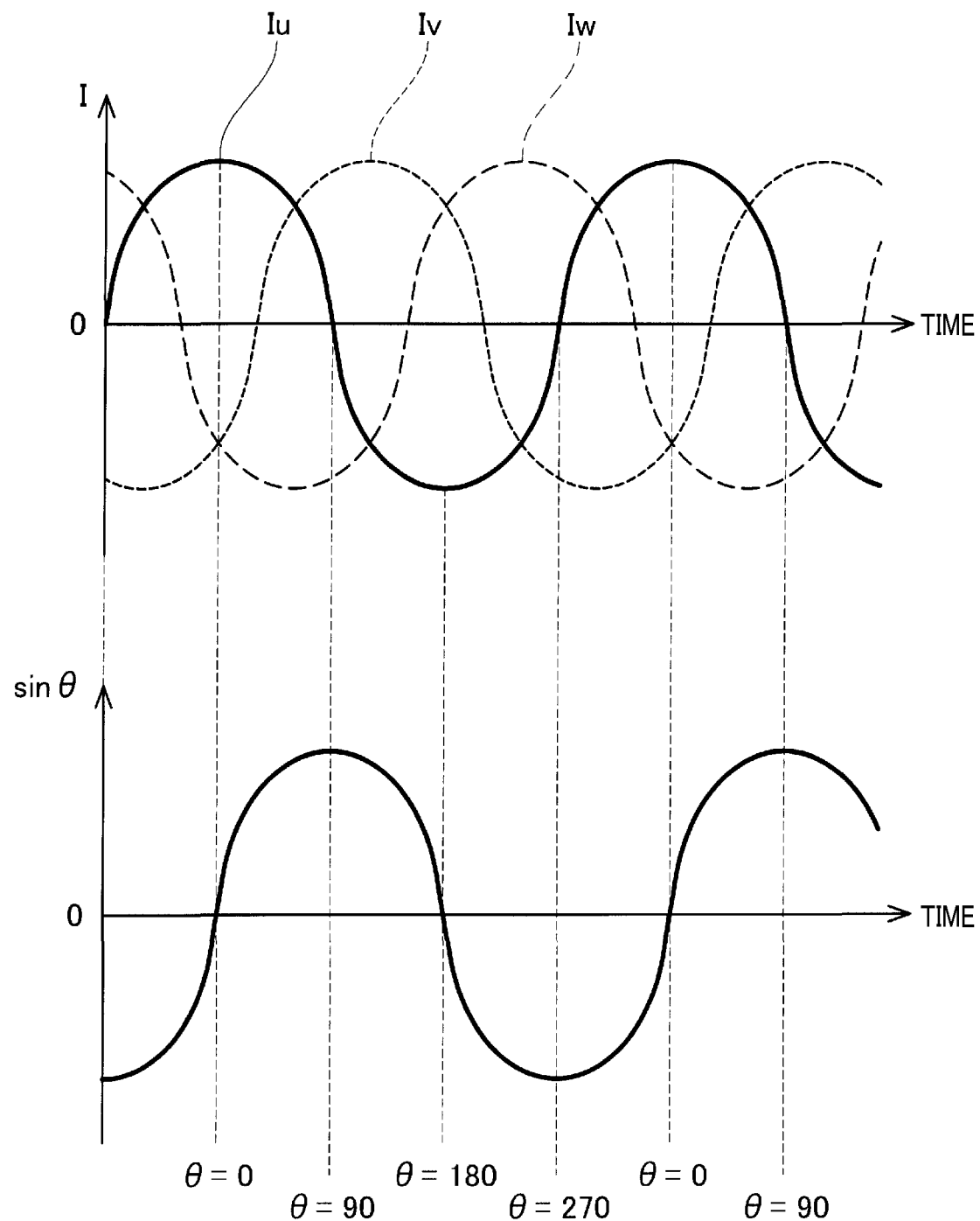
FIG. 5 is a graph illustrating an angle of an outputted voltage vector and a three-phase AC current.

5 illustrates a relationship between currents Iu, Iv, Iw flowing through the three output wirings 60u, 60v, 60w and the angle θ of the outputted voltage vector. As shown in FIG. 5, the phase of the angle θ of the voltage vector is displaced approximately 90° with respect to the phase of the current Iu. However, the phase difference between the angle θ and the current Iu may further change from the state shown in FIG. 5. When the frequency of the three-phase AC current is changed, the phase difference between the angle θ and the current Iu may change.

(Change in Neutral Point Potential VM)

Figure 6:
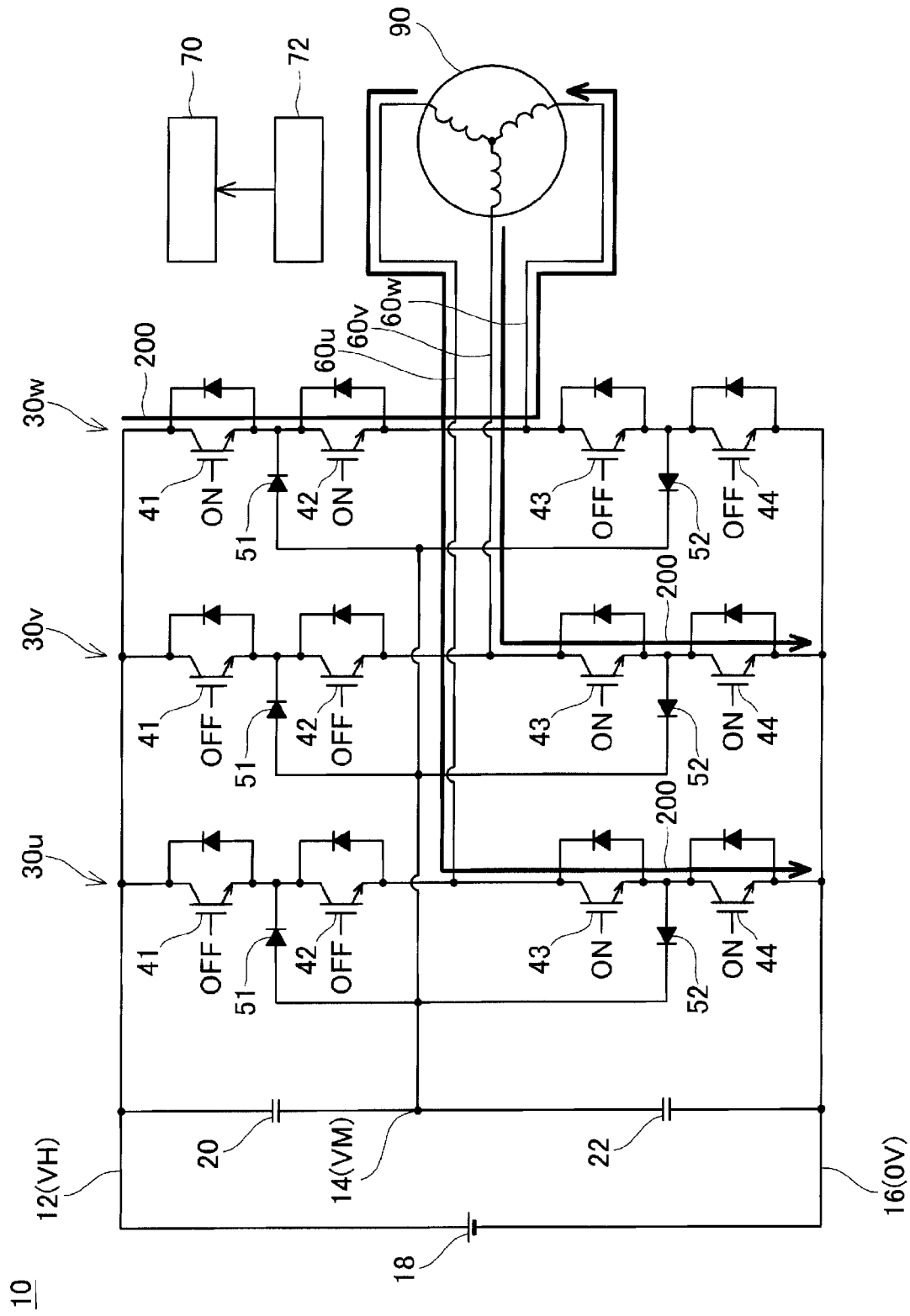
FIG. 6 is a circuit diagram illustrating current paths when (0, 0, 2) is output.

Next, change in the neutral point potential VM will be described. In cases of the voltage vectors shown in FIG. 3 which do not include value 1, the neutral point potential VM is not applied to any of the three output wirings 60. In these cases, the neutral point potential VM does not change. For example, when (0, 0, 2) is output, as shown in FIG. 6, the output wirings 60u, 60v are connected to the low potential wiring 16. The output wiring 60w is connected to the high potential wiring 12. Depending on the operating state of the traction motor 90, a current flows in the direction corresponding to the voltage applied to the traction motor 90 (hereinafter, referred to as a forward direction) or in the direction opposite to the direction corresponding to the voltage applied to the traction motor 90 (hereinafter, referred to as a reverse direction). When a current flows in the forward direction, as indicated by an arrow 200 in FIG. 6, the current flows from the high potential wiring 12 to the traction motor 90 through the output wiring 60w. The current that has flowed into the traction motor 90 flows to the low potential wiring 16 through the output wirings 60u, 60v. When a current flows in the reverse direction, the current flows in the direction opposite to the direction of the arrow 200. In any of the above cases, electric charge do not flow into the neutral point 14 and do not flow out from the neutral point 14. Hence, in these cases, the neutral point potential VM does not change. Similarly, when (2, 0, 0), (2, 2, 0), (0, 2, 0), (0, 2, 2), (2, 0, 2) are output as voltage vectors, the neutral point potential VM does not change.

When the voltage vector including value 1 shown in FIG. 3 is output, since the neutral point 14 is connected to at least one of the three output wirings 60, the neutral point potential VM changes.

Figure 7:
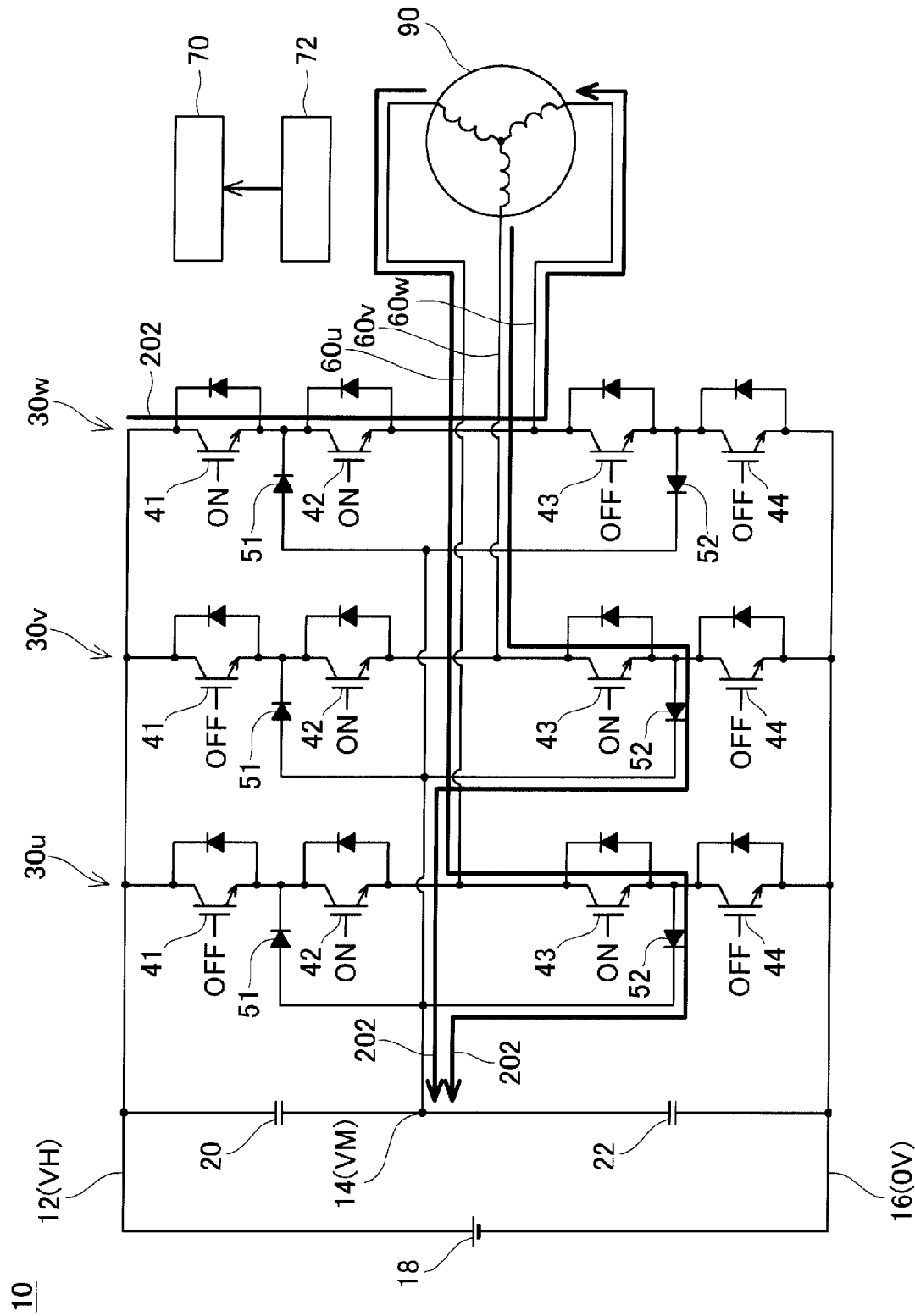
FIG. 7 is a circuit diagram illustrating current paths when (1, 1, 2) is output and current flows in the forward direction.

For example, when (1, 1, 2) is output, as shown in FIG. 7, the output wirings 60u, 60v, 60w are connected to the neutral point 14, and the output wiring 60w is connected to the high potential wiring 12. When a current flows in the forward direction, as indicated by an arrow 202 in FIG. 7, the current flows from the high potential wiring 12 to the traction motor 90 through the output wiring 60w. The current that has flowed into the traction motor 90 flows to the neutral point 14 through the output wirings 60u, 60v. In this case, since the upper side capacitor 20 is discharged, the neutral point potential VM increases. When a current flows in the reverse direction, as indicated by an arrow 204 in FIG. 8, the current flows from the neutral point 14 to the traction motor 90 through the output wirings 60u, 60v. The current that has flowed into the traction motor 90 flows to the high potential wiring 12 through the output wiring 60w. In this case, since the upper side capacitor 20 is discharged, the neutral point potential VM decreases. Thus, when (1, 1, 2) is output, the neutral point potential VM increases when a current flows in the forward direction, and the neutral point potential VM decreases when a current flows in the reverse direction. Similarly, when (2, 1, 1), (2, 2, 1), (1, 2, 1), (1, 2, 2), (2, 1, 2) are output as voltage vectors, the neutral point potential VM increases when a current flows in the forward direction, and the neutral point potential VM decreases when a current flows in the reverse direction.

Figure 9:
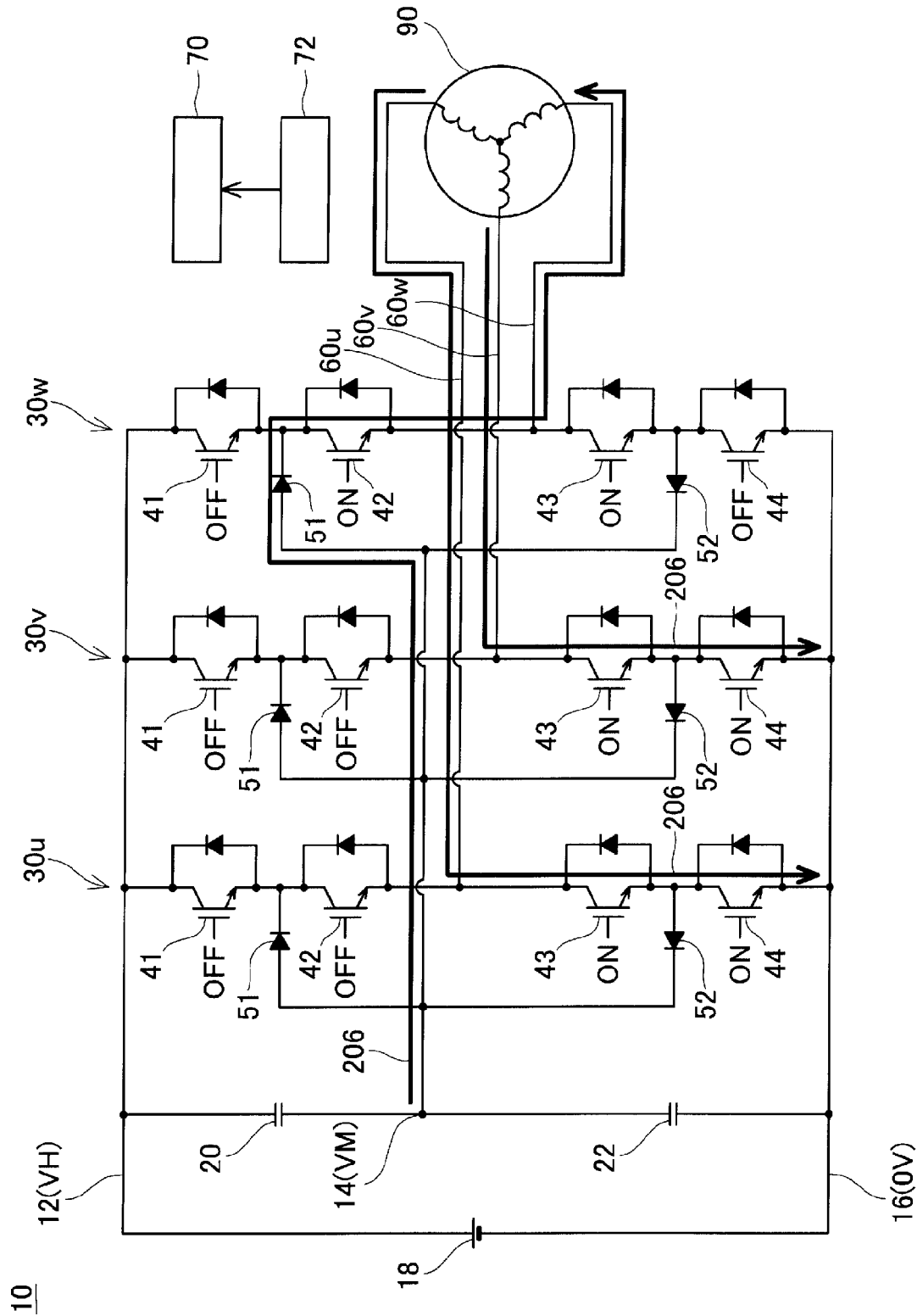
FIG. 9 is a circuit diagram illustrating current paths when (0, 0, 1) is output and current flows in the forward direction.

For example, when (0, 0, 1) is output, as shown in FIG. 9, the output wirings 60u, 60v are connected to the low potential wiring 16, and the output wiring 60w is connected to the neutral point 14. When a current flows in the forward direction, as indicated by the arrow 206 in FIG. 9, the current flows from the neutral point 14 to the traction motor 90 through the output wiring 60w. The current that has flowed into the traction motor 90 flows to the low potential wiring 16 through the output wirings 60u, 60v. In this case, since the lower side capacitor 22 is discharged, the neutral point potential VM decreases. When a current flows in the reverse direction, as indicated by an arrow 208 in FIG. 10, the current flows from the low potential wiring 16 to the traction motor 90 through the output wirings 60u, 60v. The current that has flowed into the traction motor 90 flows to the neutral point 14 through the output wiring 60w. In this case, since the lower side capacitor 22 is charged, the neutral point potential VM increases. As described above, when (0, 0, 1) is output, the neutral point potential VM decreases when a current flows in the forward direction, and the neutral point potential VM increases when a current flows in the reverse direction. Similarly, when (1, 0, 0), (1, 1, 0), (0, 1, 0), (0, 1, 1), (1, 0, 1) are output as voltage vectors, the neutral point potential VM decreases when a current flows in the forward direction, and the neutral point potential VM increases when a current flows in the reverse direction.

Even when voltage vectors (2, 1, 0), (1, 2, 0), (0, 2, 1), (0, 1, 2), (1, 0, 2), (2, 0, 1) shown in FIG. 3 are output, since electric charge is flowed into the neutral point 14 or flowed out from the neutral point 14, the neutral point potential VM changes.

As described above, when torque required for the traction motor 90 is low, the command circuit 72 changes the command value vector depending on the neutral point potential VM. For example, if the neutral point potential VM is lower than a control target value, the command circuit 72 generates a command value vector that increases the neutral point potential VM. For example, if the neutral point potential VM is higher than the control target value, the command circuit 72 generates a command value vector that decreases the neutral point potential VM. As described above, in normal operation, the control circuit 70 controls potentials of the three output wirings 60 in accordance with the command value vector. Hence, a three-phase AC current can be supplied to the traction motor 90 while the neutral point potential VM is controlled to be close to a target value.

(Short-Circuit Element Determination Operation)

Next, a short-circuit element determination operation will be described. When the vehicle is not traveling, the control circuit 70 periodically performs the short-circuit element determination operation. In the short-circuit element determination operation, for each of the switching circuits 30u, 30v, 30w, the control circuit 70 determines whether any of the switching elements 41 to 44 and the diodes 51 to 52 has caused a short fault. A short fault of a switching element means a fault mode in which the switching element is in an on state regardless of the potential of the gate. A short fault of a diode means a fault mode in which a current can flow through a diode in either direction. The control circuit 70 selects any of the three switching circuits 30u, 30v, 30w and performs the short-circuit element determination operation for the selected switching circuit 30. The control circuit 70 may select all the three switching circuits 30 and perform the short-circuit element determination operation for all of the selected switching circuits 30 simultaneously. Since the same short-circuit element determination operation is performed for the switching circuits 30u, 30v, 30w, hereinafter, the short-circuit element determination operation for one switching circuit 30 will be described.

Each of the switching elements 41 to 44 includes a current detection terminal. The control circuit 70 is connected the current detection terminals of the switching elements 41 to 44. The control circuit 70 can detect principal currents (collector-emitter currents) of the switching elements 41 to 44 from potentials of the current detection terminals.

Figure 11:
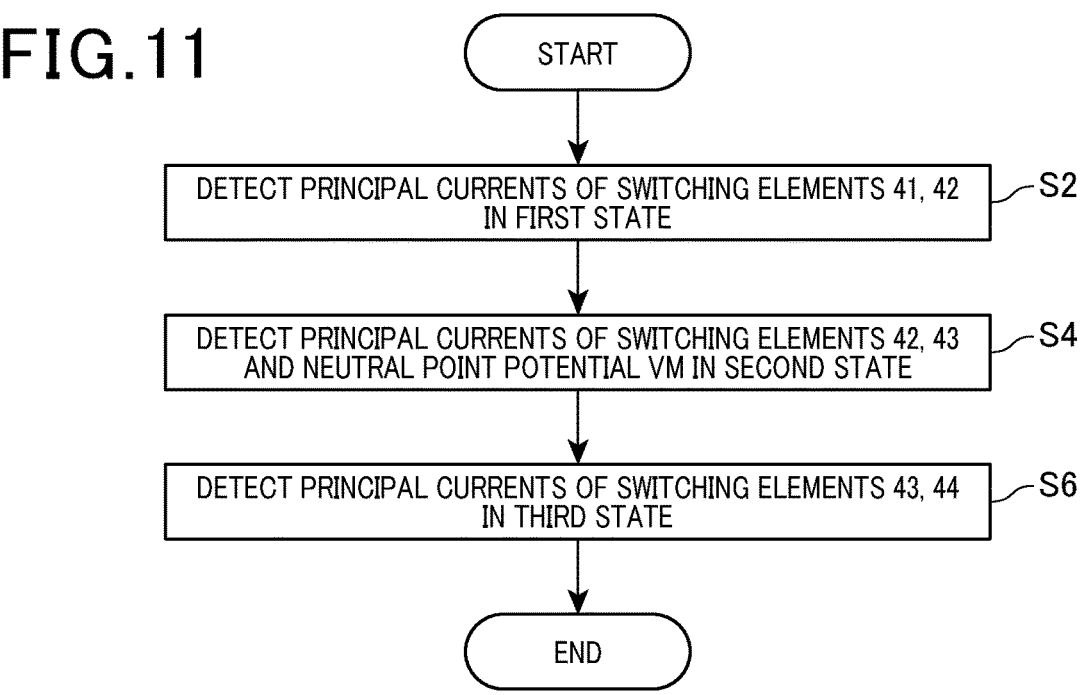
FIG. 11 is a flowchart of a short-circuit element determination operation.

FIG. 11 is a flowchart of the short-circuit element determination operation. On starting the short-circuit element determination operation, first in step S2, the control circuit 70 controls the switching circuits 30 in the first state. That is, the control circuit 70 turns on the first switching element 41 and the second switching element 42 and turns off the third switching element 43 and the fourth switching element 44. In step S2, the control circuit 70 detects principal currents of the switching elements 41, 42.

Figure 12:
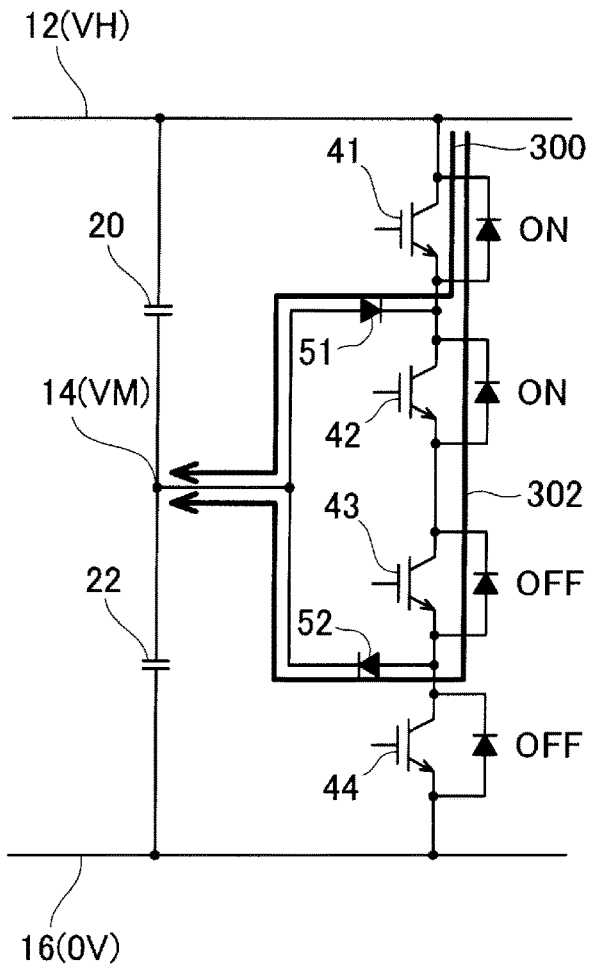
FIG. 12 is a circuit diagram illustrating paths of short-circuit currents when a first diode and a third switching element have caused short faults.

In step S2 (i.e., the first state), if the first diode 51 has caused a short fault, a line-to-line short circuit occurs between the high potential wiring 12 and the neutral point 14 as indicated by an arrow 300 shown in FIG. 12. In this case, a short-circuit current (overcurrent) is detected in the first switching element 41, whereas no short-circuit current is detected in the second switching element 42. Hence, in step S2, if a short-circuit current has been detected in the first switching element 41, and the no short-circuit current has been detected in the second switching element 42, the control circuit 70 determines that the first diode 51 is an element that has caused a short fault (referred to as a short fault element).

In step S2 (i.e., the first state), if the third switching element 43 has caused a short fault, a line-to-line short circuit occurs between the high potential wiring 12 and the neutral point 14 as indicated by an arrow 302 shown in FIG. 12. In this case, short-circuit currents are detected in both of the first switching element 41 and the second switching element 42. Hence, in step S2, if short-circuit currents have been detected in both of the first switching element 41 and the second switching element 42, the control circuit 70 determines that the third switching element 43 is an element that has caused a short fault.

In step S2 (i.e., the first state), even if the first switching element 41, the second switching element 42, the fourth switching element 44, or the second diode 52 has caused a short fault, a line-to-line short circuit does not occur. Hence, in this case, no short-circuit current is detected in any of the first switching element 41 and the second switching element 42.

Next, in step S4, the control circuit 70 controls the switching circuits 30 in the second state. That is, the control circuit 70 turns on the second switching element 42 and the third switching element 43 and turns off the first switching element 41 and the fourth switching element 44. In step S4, the control circuit 70 detects principal currents of the switching elements 42, 43 and the neutral point potential VM.

Figure 13:
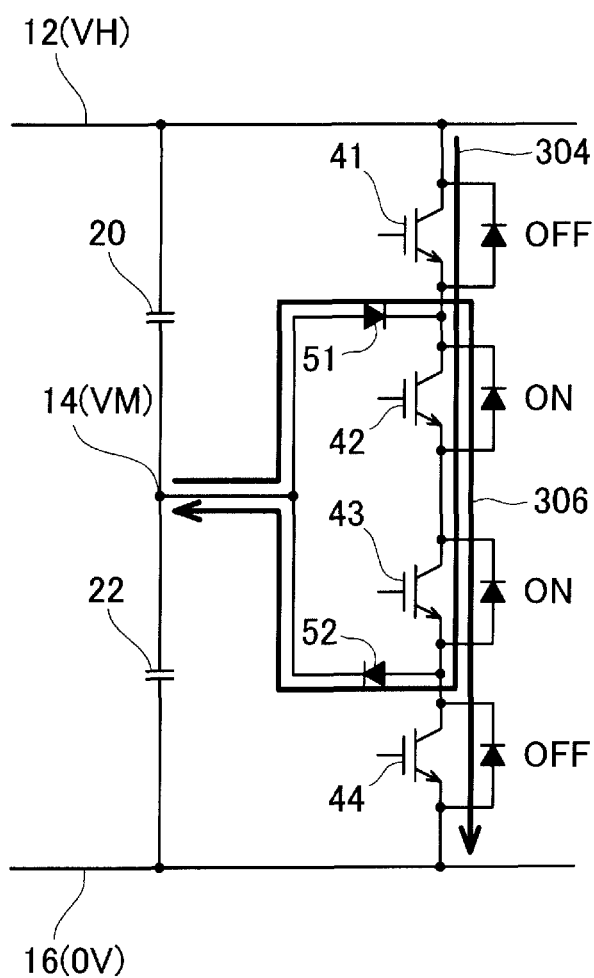
FIG. 13 is a circuit diagram illustrating paths of short-circuit currents when a first switching element and a fourth switching element have caused short faults.

In step S4 (i.e., the second state), if the first switching element 41 has caused a short fault, a line-to-line short circuit occurs between the high potential wiring 12 and the neutral point 14 as indicated by an arrow 304 shown in FIG. 13. In this case, short-circuit currents are detected in the second switching element 42 and the third switching element 43. In addition, the lower side capacitor 22 is charged, whereby the neutral point potential VM increases. Hence, in step S4, if short-circuit currents have been detected in the second switching element 42 and the third switching element 43, and the neutral point potential VM has increased, the control circuit 70 determines that the first switching element 41 is an element that has caused a short fault.

In step S4 (i.e., the second state), if the fourth switching element 44 has caused a short fault, a line-to-line short circuit occurs between the neutral point 14 and the low potential wiring 16 as indicated by an arrow 306 shown in FIG. 13. In this case, short-circuit currents are detected in the second switching element 42 and the third switching element 43. In addition, the lower side capacitor 22 is discharged, whereby the neutral point potential VM decreases. Hence, in step S6, if short-circuit currents have been detected in the second switching element 42 and the third switching element 43, and the neutral point potential VM has decreased, the control circuit 70 determines that the fourth switching element 44 is an element that has caused a short fault.

In step S4 (i.e., the second state), even if the second switching element 42, the third switching element 43, the first diode 51, or the second diode 52 has caused a short fault, a line-to-line short circuit does not occur. Hence, in this case, no short-circuit current is detected in any of the second switching element 42 and the third switching element 43.

Next, in step S6, the control circuit 70 controls the switching circuits 30 in the third state. That is, the control circuit 70 turns on the third switching element 43 and the fourth switching element 44 and turns off the first switching element 41 and the second switching element 42. In step S6, the control circuit 70 detects principal currents of the switching elements 43, 44.

Figures 14, 15:
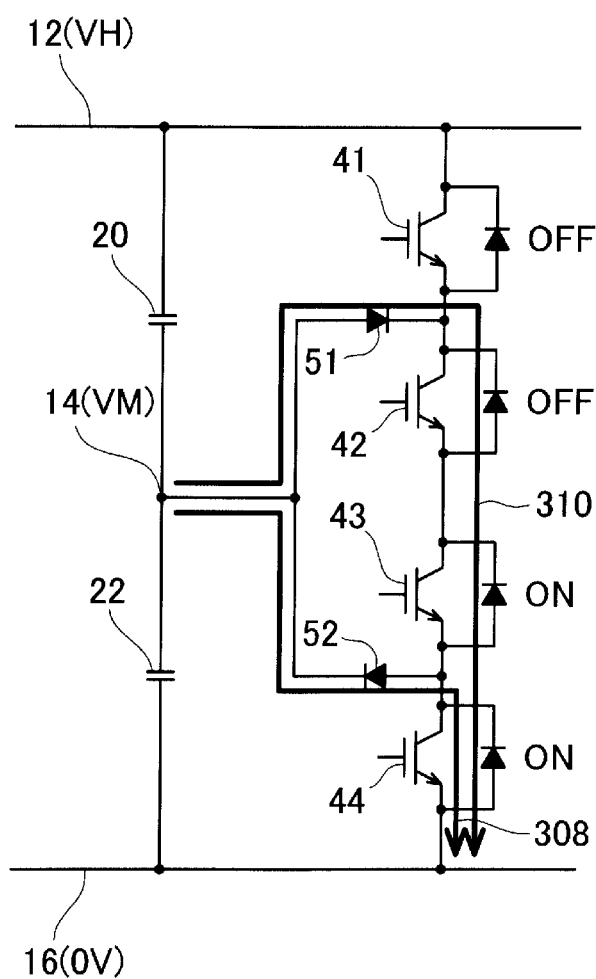
FIG. 14 is a circuit diagram illustrating paths of short-circuit currents when a second diode and a second switching element have caused short faults.
FIG. 15 is a table illustrating inhibiting potentials.

In step S6 (i.e., the third state), if the second diode 52 has caused a short fault, a line-to-line short circuit occurs between the neutral point 14 and the low potential wiring 16 as indicated by an arrow 308 shown in FIG. 14. In this case, a short-circuit current is detected in the fourth switching element 44, whereas no short-circuit current is detected in the third switching element 43. Hence, in step S6, if a short-circuit current has been detected in the fourth switching element 44, and no short-circuit current has been detected in the third switching element 43, the control circuit 70 determines that the second diode 52 is an element that has caused a short fault.

In step S6 (i.e., the third state), if the second switching element 42 has caused a short fault, a line-to-line short circuit occurs between the neutral point 14 and the low potential wiring 16 as indicated by an arrow 310 shown in FIG. 14. Thus, short-circuit currents are detected in both of the third switching element 43 and the fourth switching element 44. Hence, in step S6, if short-circuit currents have been detected in both of the third switching element 43 and the fourth switching element 44, the control circuit 70 determines that the second switching element 42 is an element that has caused a short fault.

In step S6 (i.e., the third state), even if the first switching element 41, the third switching element 43, the fourth switching element 44, or the first diode 51 has caused a short fault, a line-to-line short circuit does not occur. Hence, in this case, no short-circuit current is detected in any of the third switching element 43 and the fourth switching element 44.

As described above, the control circuit 70 determines which is an element that has caused a short fault among the switching elements 41 to 44 and the diodes 51 to 52, based on the detection results in steps S2 to S6. If no short-circuit current is detected in any of steps S2 to S6, the control circuit 70 determines that no element that has caused a short fault is present.

(Inhibiting Potential)

When the traction motor 90 is required to be driven in a state in which an element that has caused a short fault is present, the control circuit 70 performs an emergency operation. Hereinafter, the switching circuit 30 having an element that has caused a short fault is referred to as a limit switching circuit 30x. The output wiring 60 of the limit switching circuit 30x is referred to as a limit output wiring 60x. The switching circuit 30 other than the limit switching circuit 30x is referred to as a normal switching circuit 30y. The output wiring 60 of the normal switching circuit 30y is referred to as a normal output wiring 60y. The emergency operation is performed when the number of the limit switching circuits 30x is one and the number of the elements that has caused a short fault is one. In the emergency operation, the limit switching circuit 30x is controlled so that an inhibiting potential is not applied to the limit output wiring 60x. First, the inhibiting potential will be described.

The inhibiting potential means a voltage that cannot be applied to the limit output wiring 60x because a line-to-line short circuit occurs in the limit switching circuit 30x. FIG. 15 illustrates a relationship between elements that have caused a short fault and inhibiting potentials. The inhibiting potentials are different from each other depending on the types of the elements that have caused a short fault in the limit switching circuit 30x.

As indicated by the arrow 304 shown in FIG. 13, if the first switching element 41 has caused a short fault, a line-to-line short circuit occurs between the high potential wiring 12 and the neutral point 14 in the second state. Thus, if the first switching element 41 has caused a short fault, the limit switching circuit 30x cannot be in the second state, whereby the neutral point potential VM cannot be applied to the limit output wiring 60x. Hence, as shown in FIG. 15, if the first switching element 41 has caused a short fault, the inhibiting potential is the neutral point potential VM.

As indicated by the arrow 310 shown in FIG. 14, if the second switching element 42 has caused a short fault, a line-to-line short circuit occurs between the neutral point 14 and the low potential wiring 16 in the third state. Thus, if the second switching element 42 has caused a short fault, the limit switching circuit 30x cannot be in the third state, whereby 0V cannot be applied to the limit output wiring 60x. Hence, as shown in FIG. 15, if the second switching element 42 has caused a short fault, the inhibiting potential is 0V.

As indicated by the arrow 302 shown in FIG. 12, if the third switching element 43 has caused a short fault, a line-to-line short circuit occurs between the high potential wiring 12 and the neutral point 14 in the first state. Thus, if the third switching element 43 has caused a short fault, the limit switching circuit 30x cannot be in the first state, whereby the potential VH cannot be applied to the limit output wiring 60x. Hence, as shown in FIG. 15, if the third switching element 43 has caused a short fault, the inhibiting potential is the potential VH.

As indicated by the arrow 306 shown in FIG. 13, if the fourth switching element 44 has caused a short fault, a line-to-line short circuit occurs between the neutral point 14 and the low potential wiring 16 in the second state. Thus, if the fourth switching element 44 has caused a short fault, the limit switching circuit 30x cannot be in the second state, whereby the neutral point potential VM cannot be applied to the limit output wiring 60x. Hence, as shown in FIG. 15, if the fourth switching element 44 has caused a short fault, the inhibiting potential is the neutral point potential VM.

As indicated by the arrow 300 shown in FIG. 12, if the first diode 51 has caused a short fault, a line-to-line short circuit occurs between the high potential wiring 12 and the neutral point 14 in the first state. Thus, if first diode 51 has caused a short fault, the limit switching circuit 30x cannot be in the first state, whereby the potential VH cannot be applied to the limit output wiring 60x. Hence, as shown in FIG. 15, if the first diode 51 has caused a short fault, the inhibiting potential is the potential VH.

As indicated by the arrow 308 shown in FIG. 14, if the second diode 52 has caused a short fault, a line-to-line short circuit occurs between the neutral point 14 and the low potential wiring 16 in the third state. Thus, if the second diode 52 has caused a short fault, the limit switching circuit 30x cannot be in the third state, whereby 0V cannot be applied to the limit output wiring 60x. Hence, as shown in FIG. 15, if the second diode 52 has caused a short fault, the inhibiting potential is 0V.

As described above, the inhibiting potential that cannot be applied to the limit output wiring 60x changes depending on an element that has caused a short fault.

(Emergency Operation)

In the emergency operation, the control circuit 70 selects one voltage vector satisfying a specific condition from among a plurality of voltage vectors having the same angle θ as that of a command value vector received from the command circuit 72, and outputs the selected voltage vector. Hereinafter, the voltage vector selected by the control circuit 70 may be referred to as a specific voltage vector. The command value vector and the specific voltage vector are the same or different from each other. Rules for selecting a specific voltage vector by the control circuit 70 changes depending on the inhibiting potential.

(A. Emergency Operation when Inhibiting Potential is Neutral Point Potential VM)

When the inhibiting potential is the neutral point potential VM (i.e., when the element that has caused a short fault is the first switching element 41 or the fourth switching element 44), the control circuit 70 selects, as a specific voltage vector, the voltage vector that does not include value 1 from among a plurality of voltage vectors having the same angle θ as that of a command value vector. For example, when the command value vector is (2, 2, 1), the voltage vectors having the same angle θ as that of the voltage vector (2, 2, 1) are (2, 2, 0), (2, 2, 1), and (1, 1, 0). In this case, from among these three voltage vectors, the control circuit 70 selects, as a specific voltage vector, the voltage vector (2, 2, 0) that does not include value 1. The control circuit 70 controls potentials of the three output wirings 60 in accordance with the selected specific voltage vector, that is, (2, 2, 0). Similarly, when the command value vector is (1, 1, 0), the control circuit 70 selects (2, 2, 0) as a specific voltage vector. When the command value vector is (2, 2, 0), the control circuit 70 selects the same (2, 2, 0) as a specific voltage vector. Thus, in the emergency operation in which the inhibiting potential is the neutral point potential VM, the voltage vector that does not include value 1 is output. In other words, in this operation, the control circuit 70 outputs voltage vectors (2, 0, 0), (2, 2, 0), (0, 2, 0), (0, 2, 2), (0, 0, 2), (2, 0, 2). Hence, all the potentials of the output wirings 60 are controlled in two levels of potentials VH and 0V.

Figure 4:
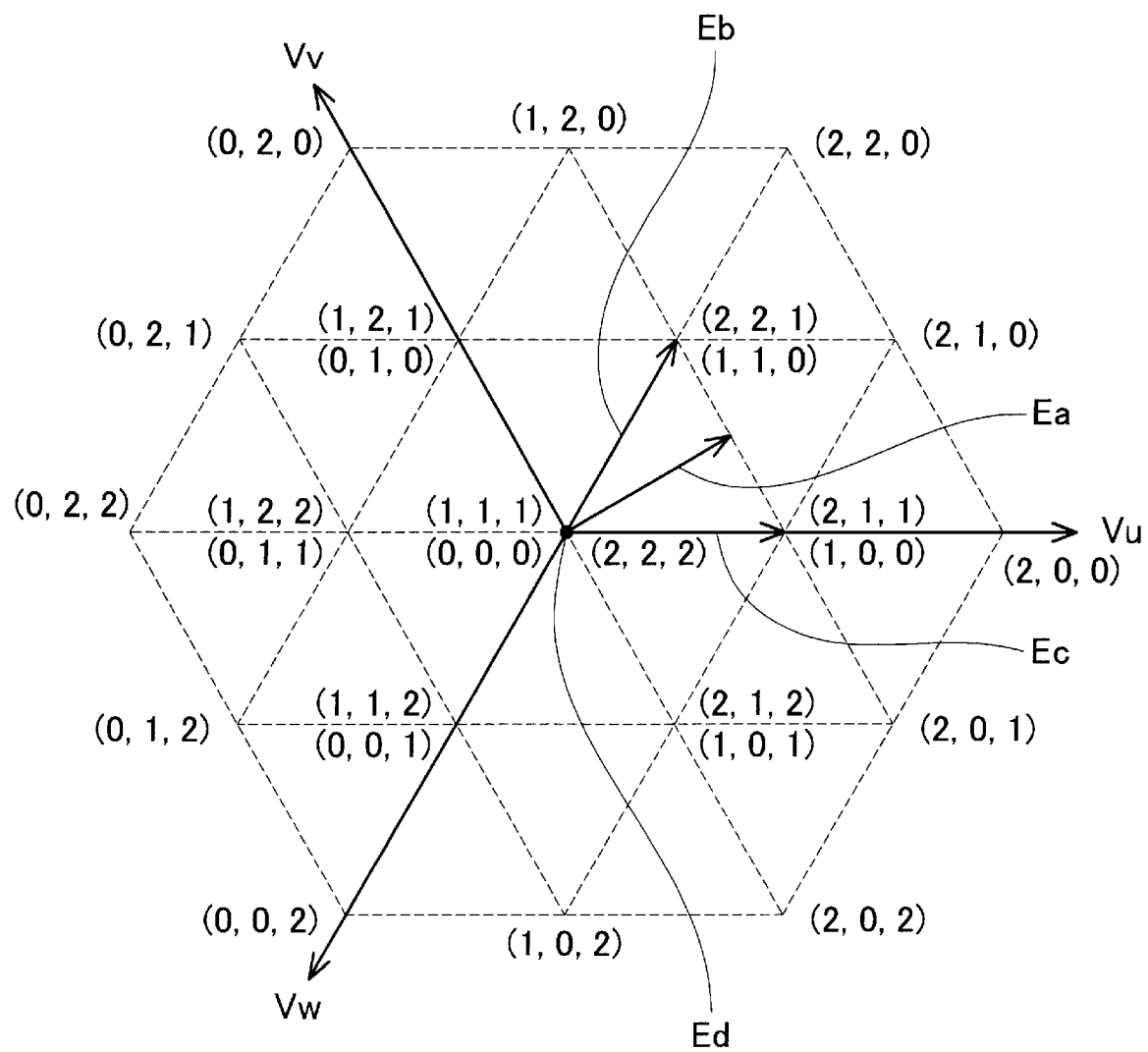
FIG. 4 is a space vector diagram illustrating a voltage vector Ea including decimal fractions as parameters.

As in the voltage vector Ea shown in FIG. 4, when the command circuit 72 is configured so as to generate a command value vector including decimal fractions as parameters, the control circuit 70 may output a plurality of available voltage vectors (e.g., in the case of FIG. 4, (2, 0, 0), (2, 2, 0), and (2, 2, 2)) around the command value vector with time differences and synthesize these voltage vectors, to output a voltage vector having the same angle θ as that of the command value vector.

As described above, in the emergency operation in which the inhibiting potential is the neutral point potential VM, the three output wirings 60 are controlled in two levels of potential VH and 0V. In this operation, since the neutral point potential VM is not applied to any of the three output wirings 60, a three-phase AC current can be continuously supplied to the traction motor 90 without being affected by the neutral point potential VM. Hence, the vehicle can continuously travel.

(B. Emergency Operation when Inhibiting Potential is 0V)

When the inhibiting potential is 0V (i.e., when the element that has caused a short fault is the second switching element 42 or the second diode 52), the control circuit 70 changes a rule for selecting a specific voltage vector depending on the neutral point potential VM. The control circuit 70 has an upper limit value Vt1, a reference value Vt2, and a lower limit value Vt3 as reference values for controlling the neutral point potential VM. The reference value Vt2 is a control target value of the neutral point potential VM. For example, the reference value Vt2 may be ½ of the potential VH. The upper limit value Vt1 is higher than the reference value Vt2. The lower limit value Vt3 is lower than the reference value Vt2. The control circuit 70 changes the rule for selecting a specific voltage vector among first to fourth rules according to the flowchart shown in FIG. 16. The control circuit 70 performs the flowchart shown in FIG. 16 every time receiving a command value vector from the command circuit 72.

Figure 16:
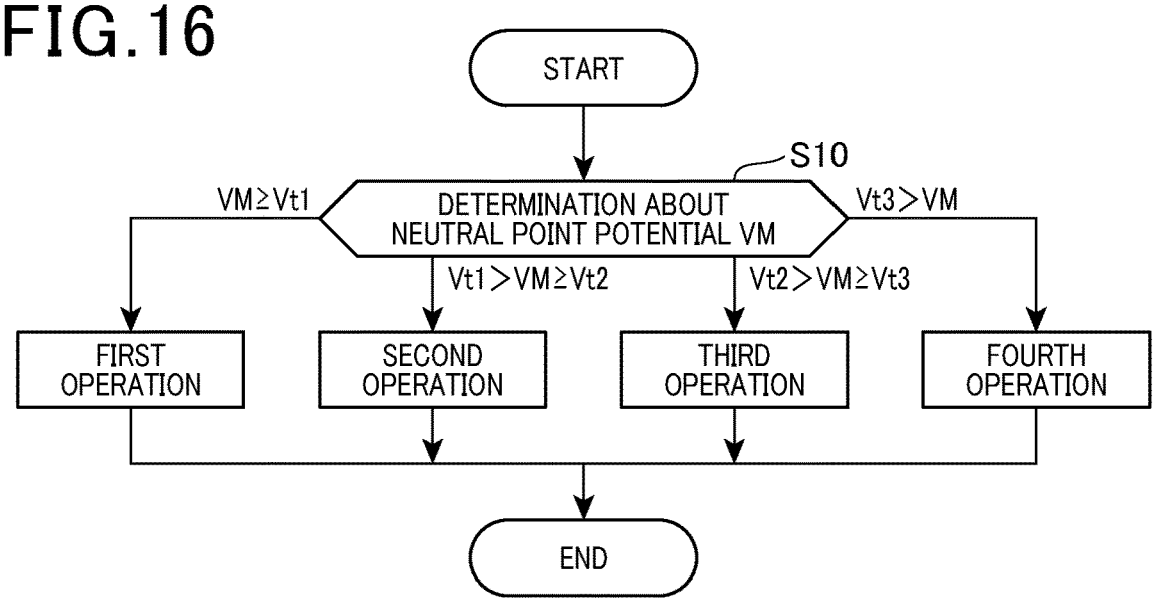
FIG. 16 is a flowchart of an emergency operation when the inhibiting potential is 0V.

In step S10 in FIG. 16, the control circuit 70 detects the neutral point potential VM and performs a determination about the detected neutral point potential VM. If the neutral point potential VM is the upper limit value Vt1 or more, the control circuit 70 employs the first rule. If the neutral point potential VM is less than the upper limit value Vt1 and not less than the reference value Vt2, the control circuit 70 employs the second rule. If the neutral point potential VM is less than the reference value Vt2 and not less than the lower limit value Vt3, the control circuit 70 employs the third rule. If the neutral point potential VM is less than the lower limit value Vt3, the control circuit 70 employs the fourth rule. The second rule and the third rules are employed when the neutral point potential VM is closed to the reference value Vt2 (control target value). The first rule and the fourth rules are employed when the neutral point potential VM is far from the reference value Vt2.

Figure 17:
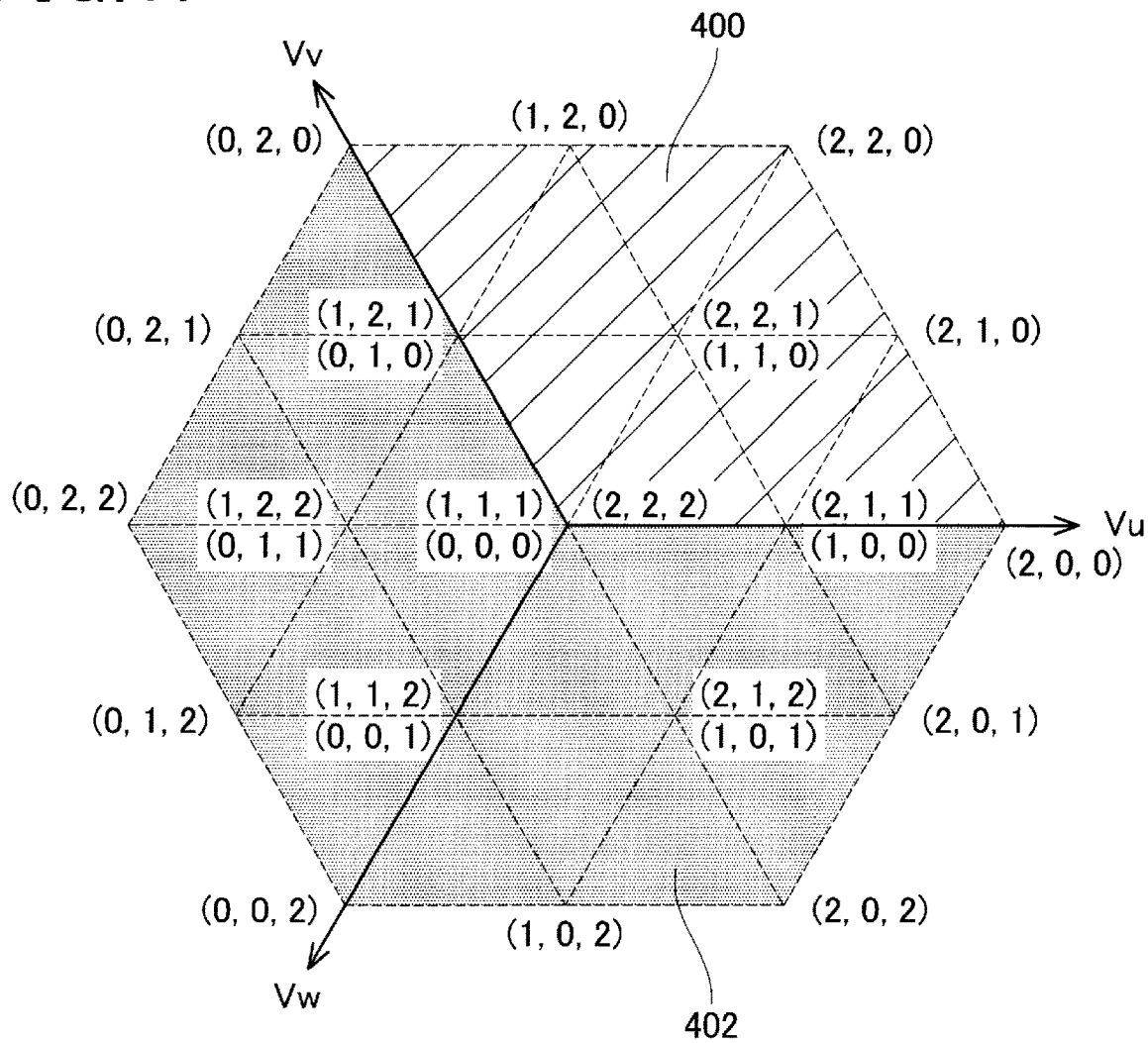
FIG. 17 is a space vector diagram illustrating an example of a limited angular range when the inhibiting potential is 0V.

Under any of the first to fourth rules, the control circuit 70 determines whether the angle θ of the received command value vector is within a limited angular range or a normal angular range. Hereinafter, the limited angular range and the normal angular range will be described. As described above, in the emergency operation, since an inhibiting potential cannot be applied to the limit output wiring 60x, some voltage vectors cannot be output. Hereinafter, such a voltage vector that cannot be output (i.e., the voltage vector by which the limit output wiring 60x becomes the inhibiting potential) is referred to as an inhibiting vector. The limited angular range means an angular range including the inhibiting vector. For example, in the space vector diagram of FIG. 17, a limited angular range is indicated by a referential numeral 400. In FIG. 17, as an example, a limited angular range in a case in which the W-phase output wiring 60w is the limit output wiring 60x and the inhibiting potential is 0V is shown. In FIG. 7, voltage vectors having Vw of 0 (i.e., (0, 0, 0), (1, 0, 0), (1, 1, 0), (0, 1, 0), (2, 0, 0), (2, 1, 0), (2, 2, 0), (1, 2, 0), and (0, 2, 0)) are inhibiting vectors. The range of the angle θ in which these inhibiting vectors are present is the limited angular range. In FIG. 17, the angular range 0° 0 120° is the limited angular range. Even within the limited angular range, the voltage vectors having Vw of not 0 can be output. Hereinafter, the voltage vector within the limited angular range which can be output is referred to as an allowable vector. For example, in FIG. 17, (1, 1, 1), (2, 2, 2), (2, 1, 1), (2, 2, 1), and (1, 2, 1) are allowable vectors. The angular range outside the limited angular range is the normal angular range. In FIG. 17, the normal angular range is indicated by a referential numeral 402. All the voltage vectors within the normal angular range can be output.

Furthermore, under any of the first to fourth rules, the control circuit 70 determines whether a current flows to the traction motor in the forward direction or the reverse direction, based on the current flowing to the limit output wiring 60x. As described above, the forward direction means a direction corresponding to the voltage applied to the traction motor 90. The reverse direction means a direction opposite to the direction corresponding to the voltage applied to the traction motor 90.

Figure 8:
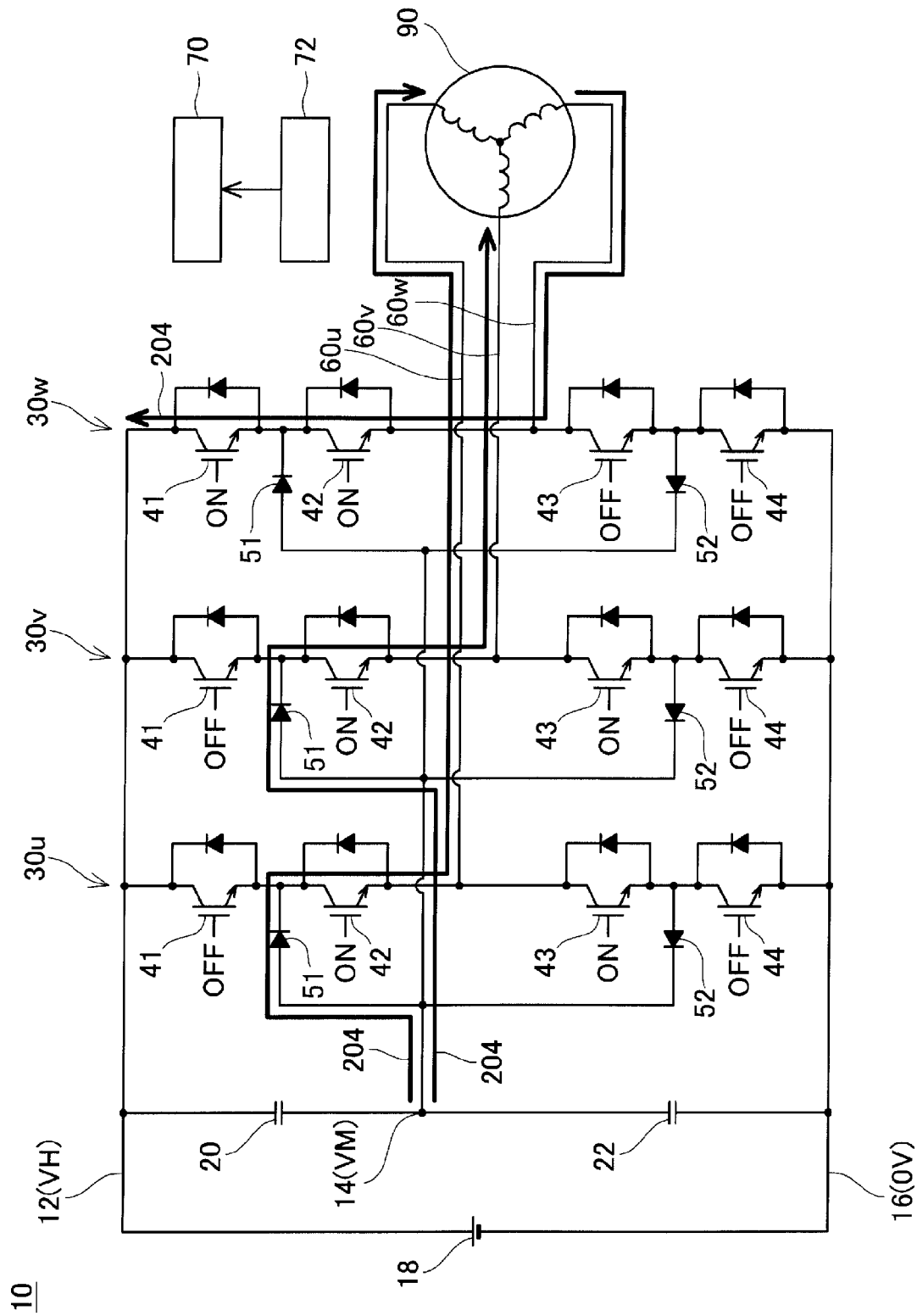
FIG. 8 is a circuit diagram illustrating current paths when (1, 1, 2) is output and current flows in the reverse direction.
Figure 10:
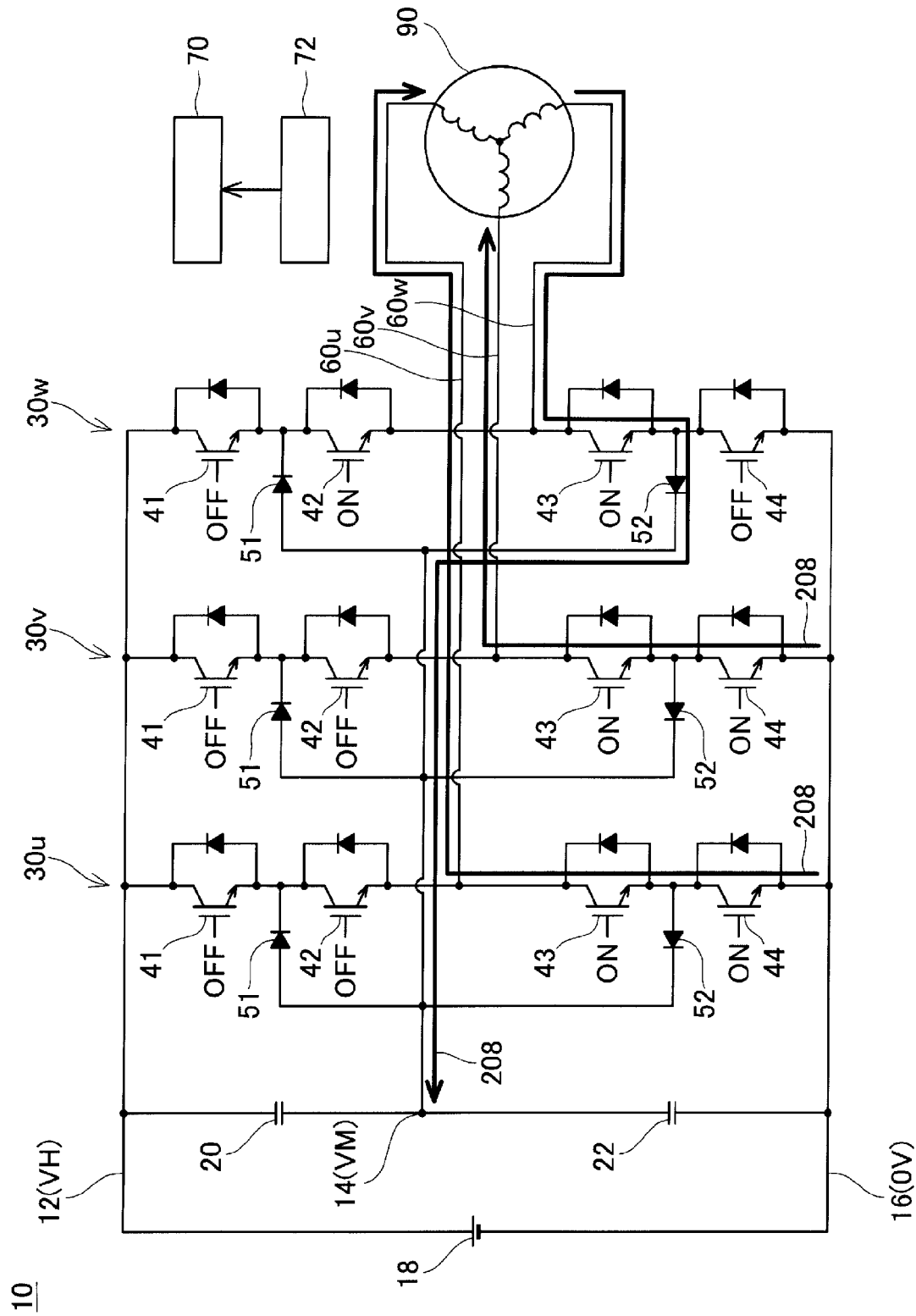
FIG. 10 is a circuit diagram illustrating current paths when (0, 0, 1) is output and current flows in the reverse direction.

Hereinafter, the voltage vector including only value 2 and value 1 is referred to as an upper side vector, and the voltage vector including only value 1 and value 0 is referred to as a lower side vector. As shown in FIG. 17, the upper side vectors are (2, 1, 1), (2, 2, 1), (1, 2, 1), (1, 2, 2), (1, 1, 2), and (2, 1, 2), and lower side vectors are (1, 0, 0), (1, 1, 0), (0, 1, 0), (0, 1, 1), (0, 0, 1), and (1, 0, 1). If the upper side vector is output, since the high potential wiring 12 and the neutral point 14 are connected to the traction motor 90, the upper side capacitor 20 is charged or discharged. For example, if the upper side vector (1, 1, 2) is output, the upper side capacitor 20 is discharged as shown in FIG. 7, or the upper side capacitor 20 is charged as shown in FIG. 8. For example, if the lower side vector (0, 0, 1) is output, the lower side capacitor 22 is discharged as shown in FIG. 9, or the lower side capacitor 22 is charged as shown in FIG. 10. In the normal angular range, the upper side vector and the lower side vector are present as a pair. For example, as shown in FIG. 17, when θ=180°, (1, 2, 2) and (0, 1, 1) are present as a pair. When θ=240°, (1, 1, 2) and (0, 0, 1) are present as a pair. When θ=300°, (2, 1, 2) and (1, 0, 1) are present as a pair.

(B-1. Second Rule)

Under the second rule, the control circuit 70 selects a specific voltage vector according to table 2 in FIG. 18, depending on the angle θ of the received command value vector and the direction of a current flowing to the limit output wiring 60x.

As shown in table 2 in FIG. 18, if the angle θ of the command value vector is within the limited angular range, the control circuit 70 selects an allowable vector as the specific voltage vector regardless of the direction of the current flowing to the limit output wiring 60x. The control circuit 70 selects, as the specific voltage vector, an allowable vector having the same angle θ as the angle θ of the command value vector. For example, in FIG. 17, if the command value vector is (2, 2, 0), the control circuit 70 selects (2, 2, 1) as the specific voltage vector. In FIG. 17, if the command value vector is (1, 1, 0), the control circuit 70 selects (2, 2, 1) as the specific voltage vector. In FIG. 17, if the command value vector is (2, 2, 1), the control circuit 70 selects the same (2, 2, 1) as the specific voltage vector. Then, the control circuit 70 controls potentials of the three output wirings 60 in accordance with the specific voltage vector. Thus, if the angle θ of the command value vector is within the limited angular range, the allowable vector having the same angle θ as that of the command value vector is output. Hence, a voltage vector having the same angle θ as that of the command value vector can be output while the inhibiting vector is prevented from being output.

If the inhibiting potential is 0V, the allowable vector is necessarily an upper side vector. If the allowable vector (upper side vector) is output when a current flows to the traction motor 90 in the forward direction, the upper side capacitor 20 is discharged, whereby the neutral point potential VM increases. If the allowable vector (upper side vector) is output when a current flows to the traction motor 90 in the reverse direction, the upper side capacitor 20 is charged, whereby the neutral point potential VM decreases.

As shown in table 2 in FIG. 18, if the angle θ of the command value vector is within the normal angular range, the control circuit 70 selects a specific voltage vector depending on the direction in which a current flows to the limit output wiring 60x. If a current flows to the traction motor 90 in the forward direction, the control circuit 70 selects, as the specific voltage vector, a lower side vector having the same angle θ as the angle θ of the command value vector. For example, in FIG. 17, if the command value vector is (0, 0, 2), the control circuit 70 selects (0, 0, 1) as the specific voltage vector. In FIG. 17, if the command value vector is (1, 1, 2), the control circuit 70 selects (0, 0, 1) as the specific voltage vector. In FIG. 17, if the command value vector is (0, 0, 1), the control circuit 70 selects the same (0, 0, 1) as the specific voltage vector. If a current flows to the traction motor 90 in the reverse direction, the control circuit 70 selects, as the specific voltage vector, an upper side vector having the same angle θ as the angle θ of the command value vector. For example, in FIG. 17, if the command value vector is (0, 0, 2), the control circuit 70 selects (1, 1, 2) as the specific voltage vector. In FIG. 17, if the command value vector is (0, 0, 1), the control circuit 70 selects (1, 1, 2) as the specific voltage vector. In FIG. 17, if the command value vector is (1, 1, 2), the control circuit 70 selects the same (1, 1, 2) as the specific voltage vector. The control circuit 70 controls potentials of the three output wirings 60 in accordance with the specific voltage vector.

Thus, in the normal angular range, a lower side vector is output when a current flows in the forward direction, and an upper side vector is output when a current flows in the reverse direction. If a lower side vector is output when a current flows in the forward direction, the lower side capacitor 22 is discharged, whereby the neutral point potential VM decreases (e.g., refer to FIG. 9). If an upper side vector is output when a current flows in the reverse direction, the upper side capacitor 22 is charged, whereby the neutral point potential VM decreases (e.g., refer to FIG. 8). Thus, under the second rule, in the normal angular range, a voltage vector by which the neutral point potential VM decreases is selected.

As described above, under the second rule, in the limited angular range, the control circuit 70 outputs an allowable vector. When an allowable vector is output, the neutral point potential VM increases or decreases. In addition, under the second rule, in the normal angular range, the control circuit 70 outputs a voltage vector that decreases the neutral point potential VM. Hence, neutral point potential VM tends to decrease over the period during which the second rule is employed. As described above, the second rule is employed when neutral point potential VM is higher than the reference value Vt2 (control target value). Employing the second rule can restore the neutral point potential VM higher than the reference value Vt2 to a value close to the reference value Vt2.

(B-2. Third Rule)

Under the third rule, the control circuit 70 selects a specific voltage vector according to table 3 in FIG. 18, depending on the angle θ of the received command value vector and the direction of a current flowing to the limit output wiring 60x.

As shown in table 3 in FIG. 18, if the angle θ of the command value vector is within the limited angular range, the control circuit 70 selects an allowable vector as the specific voltage vector regardless of the direction of the current flowing to the limit output wiring 60x. The control circuit 70 selects, as the specific voltage vector, an allowable vector having the same angle θ as the angle θ of the command value vector. That is, the third rule in the limited angular range is equal to the second rule in the limited angular range. Thus, if the angle θ of the command value vector is within the limited angular range, the allowable vector having the same angle θ as that of the command value vector is output. Hence, a voltage vector having the same angle θ as that of the command value vector can be output while the inhibiting vector is prevented from being output.

If the allowable vector (upper side vector) is output when a current flows to the traction motor 90 in the forward direction, the upper side capacitor 20 is discharged, whereby the neutral point potential VM increases. If the allowable vector (upper side vector) is output when a current flows to the traction motor 90 in the reverse direction, the upper side capacitor 20 is charged, whereby the neutral point potential VM decreases.

As shown in table 3 in FIG. 18, if the angle θ of the command value vector is within the normal angular range, the control circuit 70 selects a specific voltage vector depending on the direction in which a current flows to the limit output wiring 60x. If a current flows to the traction motor 90 in the forward direction, the control circuit 70 selects, as the specific voltage vector, an upper side vector having the same angle θ as the angle θ of the command value vector. For example, in FIG. 17, if the command value vector is (0, 0, 2), the control circuit 70 selects (1, 1, 2) as the specific voltage vector. In FIG. 17, if the command value vector is (0, 0, 1), the control circuit 70 selects (1, 1, 2) as the specific voltage vector. In FIG. 17, if the command value vector is (1, 1, 2), the control circuit 70 selects the same (1, 1, 2) as the specific voltage vector. If a current flows to the traction motor 90 in the reverse direction, the control circuit 70 selects, as the specific voltage vector, a lower side vector having the same angle θ as the angle θ of the command value vector. For example, in FIG. 17, if the command value vector is (0, 0, 2), the control circuit 70 selects (0, 0, 1) as the specific voltage vector. In FIG. 17, if the command value vector is (1, 1, 2), the control circuit 70 selects (0, 0, 1) as the specific voltage vector. In FIG. 17, if the command value vector is (0, 0, 1), the control circuit 70 selects the same (0, 0, 1) as the specific voltage vector. The control circuit 70 controls potentials of the three output wirings 60 in accordance with the specific voltage vector.

Thus, in the normal angular range, an upper side vector is output when a current flows in the forward direction, and a lower side vector is output when a current flows in the reverse direction. If an upper side vector is output when a current flows in the forward direction, the upper side capacitor 22 is discharged, whereby the neutral point potential VM increases (e.g., refer to FIG. 7). If a lower side vector is output when a current flows in the reverse direction, the lower side capacitor 22 is charged, whereby the neutral point potential VM increases (e.g., refer to FIG. 10). Thus, under the third rule, in the normal angular range, a voltage vector by which the neutral point potential VM increases is selected.

As described above, under the third rule, in the limited angular range, the control circuit 70 outputs an allowable vector. When an allowable vector is output, the neutral point potential VM increases or decreases. In addition, under the third rule, in the normal angular range, the control circuit 70 outputs a voltage vector that increases the neutral point potential VM. Hence, the neutral point potential VM tends to increase over the period during which the third rule is employed. As described above, the third rule is employed when the neutral point potential VM is lower than the reference value Vt2 (control target value). Employing the third rule can restore the neutral point potential VM lower than the reference value Vt2 to a value close to the reference value Vt2.

(B-3. First Rule)

Under the first rule, the control circuit 70 selects a specific voltage vector according to table 1 in FIG. 18, depending on the angle θ of the command value vector and the direction of a current flowing to the limit output wiring 60x.

As is clear from a comparison between table 1 and table 2 in FIG. 18, when a current flows to the traction motor 90 in the forward direction, and the angle θ of the command value vector is within the limited angular range, the first rule (table 1) and the second rule (table 2) are different from each other. In other cases, the first rule (table 1) and the second rule (table 2) are equal to each other.

Under the first rule, when a current flows to the traction motor 90 in the forward direction, and the angle θ of the command value vector is within the limited angular range, the control circuit 70 selects a zero vector as a specific voltage vector. The zero vector is a voltage vector by which potentials of the three output wirings 60 becomes the same. The zero vector includes (0, 0, 0), (1, 1, 1), and (2, 2, 2). Here, the control circuit 70 selects a zero vector (i.e., (1, 1, 1) or (2, 2, 2)) that does not include the inhibiting potential (0V) as a specific voltage vector. The control circuit 70 outputs the specific voltage vector (i.e., zero vector).

As described above regarding the third rule, when the inhibiting potential is 0V, if the allowable vector is output when a current flows in the forward direction, the neutral point potential VM increases. The first rule is employed when the neutral point potential VM is extremely high (i.e., the neutral point potential VM is higher than the upper limit value Vt1). Thus, when the neutral point potential VM is extremely high, it is preferable to decrease the neutral point potential VM as quickly as possible. Hence, at the timing at which the neutral point potential VM increases if the allowable vector is output (i.e., the timing at which a current flows in the forward direction), the control circuit 70 stops outputting the allowable vector and outputs a zero vector. Thus, under the first rule, the neutral point potential VM can be decreased more quickly than that under the second rule, whereby the neutral point potential VM can be restored to a value close to the reference value Vt2 more quickly. Hence, under the first rule that is employed when the neutral point potential VM is extremely increased, the neutral point potential VM is controlled to an appropriate value while decreasing the neutral point potential VM is in preference to power supply to the traction motor 90.

(B-4. Fourth Rule)

Under the fourth rule, the control circuit 70 selects a specific voltage vector according to table 4 in FIG. 18, depending on the angle θ of the command value vector and the direction of a current flowing to the limit output wiring 60x.

As is clear from a comparison between table 4 and table 3 in FIG. 18, when a current flows to the traction motor 90 in the reverse direction, and the angle θ of the command value vector is within the limited angular range, the fourth rule (table 4) and the third rule (table 3) are different from each other. In other cases, the fourth rule (table 4) and the third rule (table 3) are equal to each other.

Under the fourth rule, when a current flows to the traction motor 90 in the reverse direction, and the angle θ of the command value vector is within the limited angular range, the control circuit 70 selects a zero vector as a specific voltage vector. Here, the control circuit 70 selects a zero vector (i.e., (1, 1, 1) or (2, 2, 2)) that does not include the inhibiting potential (0V) as a specific voltage vector. The control circuit 70 outputs the specific voltage vector (i.e., zero vector).

As described above regarding the third rule, when the inhibiting potential is 0V, if the allowable vector is output when a current flows in the reverse direction, the neutral point potential VM decreases. The second rule is employed when the neutral point potential VM is extremely lower (i.e., the neutral point potential VM is lower than the lower limit value Vt3). Thus, when the neutral point potential VM is extremely low, it is preferable to increase the neutral point potential VM as quickly as possible. Hence, at the timing at which the neutral point potential VM decreases if the allowable vector is output (i.e., the timing at which a current flows in the reverse direction), the control circuit 70 stops outputting the allowable vector and outputs a zero vector. Thus, under the fourth rule, the neutral point potential VM can be increased more quickly than that under the third rule, whereby the neutral point potential VM can be restored to a value close to the reference value Vt2 more quickly. Hence, under the fourth rule that is employed when the neutral point potential VM is extremely decreased, the neutral point potential VM is controlled to an appropriate value while increasing the neutral point potential VM is in preference to power supply to the traction motor 90.

As described above, when the inhibiting potential is 0V, the first to fourth rules are employed depending on the neutral point potential VM, whereby a voltage vector is output so as to rotate, while the neutral point potential VM is controlled to a value in the vicinity of the reference value Vt2. Hence, a three-phase AC current can be continuously generated to drive the traction motor 90 continuously.

In the emergency operation when the inhibiting potential is 0V, a specific voltage vector is selected in accordance with the first to fourth rules to control the potential of the limit output wiring 60x in two levels of the potential VH and the neutral point potential VM and control the potentials of the two normal output wirings 60y in three levels of the potential VH, the neutral point potential VM, and 0V.

As in the voltage vector Ea shown in FIG. 4, when the command value vector includes decimal fractions as parameters, the control circuit 70 may select a plurality of specific voltage vectors around the command value vector in accordance with the first to fourth rules and output the selected plurality of specific voltage vectors with time differences to synthesize the specific voltage vectors and output a voltage vector having the same angle θ as that of the command value vector.

(B-5. Example of Control)

Figure 19:
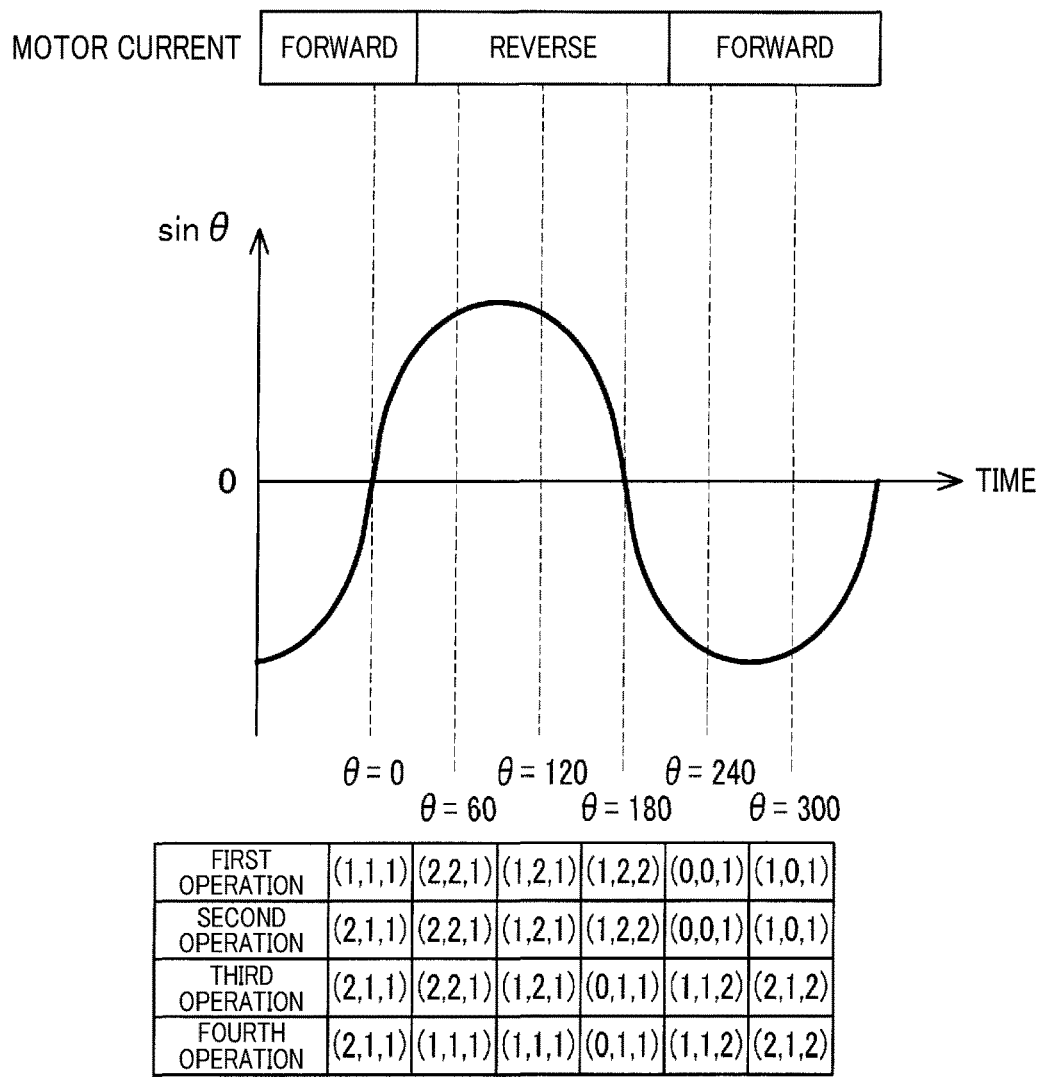
FIG. 19 is a diagram illustrating an example of voltage vectors output under the first to fourth rules.

FIG. 19 illustrates an example of the emergency operation when the inhibiting potential is 0V. In the example illustrated in FIG. 19, the limit output wiring 60x is the W-phase output wiring 60w. The graph in FIG. 19 illustrates a sine (sine θ) of the angle θ of the command value vector. The limited angular range is 0° 0 120°. In the table at the lowermost part of FIG. 19, voltage vectors (specific voltage vectors) output under each of the first rule, the second rule, the third rule, and the fourth rule are illustrated.

Under the first rule, at the timing of θ=0°, since the angle θ is within the limited angular range, and a motor current (a current flowing to the traction motor 90) flows in the forward direction, a zero vector (1, 1, 1) (or (2, 2, 2)) is output. At the timing of θ=60°, since the angle θ is within the limited angular range, and a motor current flows in the reverse direction, an allowable vector (2, 2, 1) is output. At the timing of θ=120°, since the angle θ is within the limited angular range, and a motor current flows in the reverse direction, an allowable vector (1, 2, 1) is output. At the timing of θ=180°, since the angle θ is within the normal angular range, and a motor current flows in the reverse direction, an upper side vector (1, 2, 2) is output. At the timing of θ=240°, since the angle θ is within the normal angular range, and a motor current flows in the forward direction, a lower side vector (0, 0, 1) is output. At the timing of θ=300°, since the angle θ is within the normal angular range, and a motor current flows in the forward direction, a lower side vector (1, 0, 1) is output.

Under the second rule, at the timing of θ=0°, since the angle θ is within the limited angular range, and a motor current flows in the forward direction, an allowable vector (2, 1, 1) is output. At the timing of θ=60°, since the angle θ is within the limited angular range, and a motor current flows in the reverse direction, an allowable vector (2, 2, 1) is output. At the timing of θ=120°, since the angle θ is within the limited angular range, and a motor current flows in the reverse direction, an allowable vector (1, 2, 1) is output. At the timing of θ=180°, since the angle θ is within the normal angular range, and a motor current flows in the reverse direction, an upper side vector (1, 2, 2) is output. At the timing of θ=240°, since the angle θ is within the normal angular range, and a motor current flows in the forward direction, a lower side vector (0, 0, 1) is output. At the timing of θ=300°, since the angle θ is within the normal angular range, and a motor current flows in the forward direction, a lower side vector (1, 0, 1) is output.

Under the third rule, at the timing of θ=0°, since the angle θ is within the limited angular range, and a motor current flows in the forward direction, an allowable vector (2, 1, 1) is output. At the timing of θ=60°, since the angle θ is within the limited angular range, and a motor current flows in the reverse direction, an allowable vector (2, 2, 1) is output. At the timing of θ=120°, since the angle θ is within the limited angular range, and a motor current flows in the reverse direction, an allowable vector (1, 2, 1) is output. At the timing of θ=180°, since the angle θ is within the normal angular range, and a motor current flows in the reverse direction, a lower side vector (0, 1, 1) is output. At the timing of θ=240°, since the angle θ is within the normal angular range, and a motor current flows in the forward direction, an upper side vector (1, 1, 2) is output. At the timing of θ=300°, since the angle θ is within the normal angular range, and a motor current flows in the forward direction, an upper side vector (2, 1, 2) is output. Under the fourth rule, at the timing of θ=0°, since the angle θ is within the limited angular range, and a motor current flows in the forward direction, an allowable vector (2, 1, 1) is output. At the timing of θ=60°, since the angle θ is within the limited angular range, and a motor current flows in the reverse direction, a zero vector (1, 1, 1) is output. At the timing of θ=120°, since the angle θ is within the limited angular range, and a motor current flows in the reverse direction, a zero vector (1, 1, 1) is output. At the timing of θ=180°, since the angle θ is within the normal angular range, and a motor current flows in the reverse direction, a lower side vector (0, 1, 1) is output. At the timing of θ=240°, since the angle θ is within the normal angular range, and a motor current flows in the forward direction, an upper side vector (1, 1, 2) is output. At the timing of θ=300°, since the angle θ is within the normal angular range, and a motor current flows in the forward direction, an upper side vector (2, 1, 2) is output.

As described above, selecting and outputting a specific voltage vector depending on the rule controls the neutral point potential VM to a value close to the reference value Vt2.

(C. Emergency Operation when Inhibiting Potential is VH)

When the inhibiting potential is VH (i.e., when the element that has caused a short fault is the third switching element 43 or the first diode 51), the control circuit 70 changes a rule for selecting a specific voltage vector depending on the neutral point potential VM. The control circuit 70 changes the rule for selecting a specific voltage vector among fifth to eighth rules according to the flowchart shown in FIG. 20. The control circuit 70 performs the flowchart shown in FIG. 20 every time receiving a command value vector from the command circuit 72.

Figure 20:
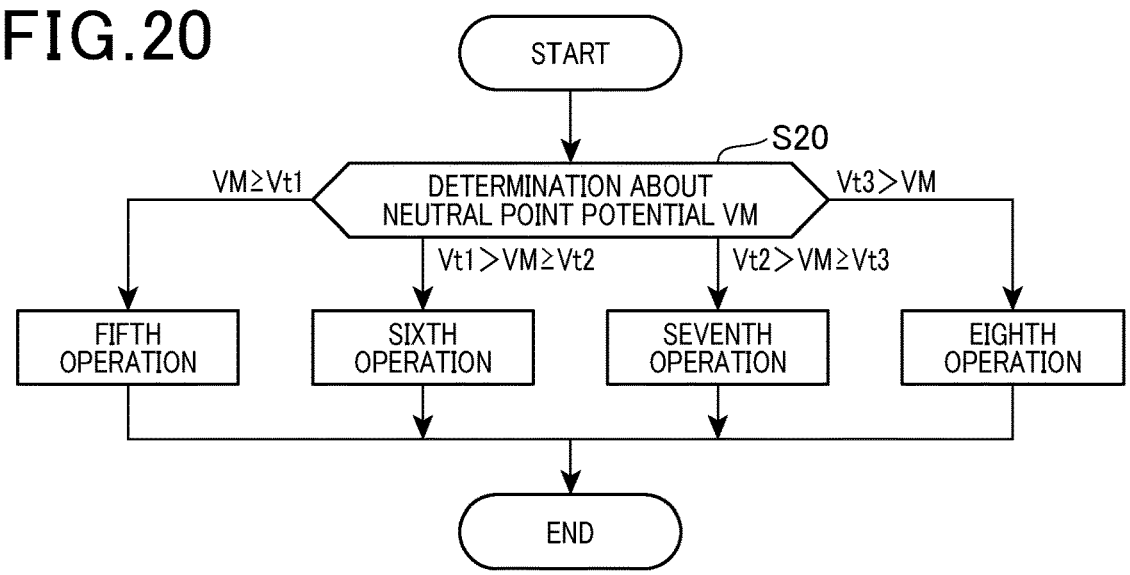
FIG. 20 is a flowchart of an emergency operation when the inhibiting potential is a potential VH.

In step S20 in FIG. 20, the control circuit 70 detects the neutral point potential VM and performs a determination about the detected neutral point potential VM. If the neutral point potential VM is the upper limit value Vt1 or more, the control circuit 70 employs the fifth rule. If the neutral point potential VM is less than the upper limit value Vt1 and not less than the reference value Vt2, the control circuit 70 employs the sixth rule. If the neutral point potential VM is less than the reference value Vt2 and not less than the lower limit value Vt3, the control circuit 70 employs the seventh rule. If the neutral point potential VM is less than the lower limit value Vt3, the control circuit 70 employs the eighth rule. The sixth rule and the seventh rules are employed when the neutral point potential VM is closed to the reference value Vt2 (control target value). The fifth rule and the eighth rules are employed when the neutral point potential VM is far from the reference value Vt2.

Figure 21:
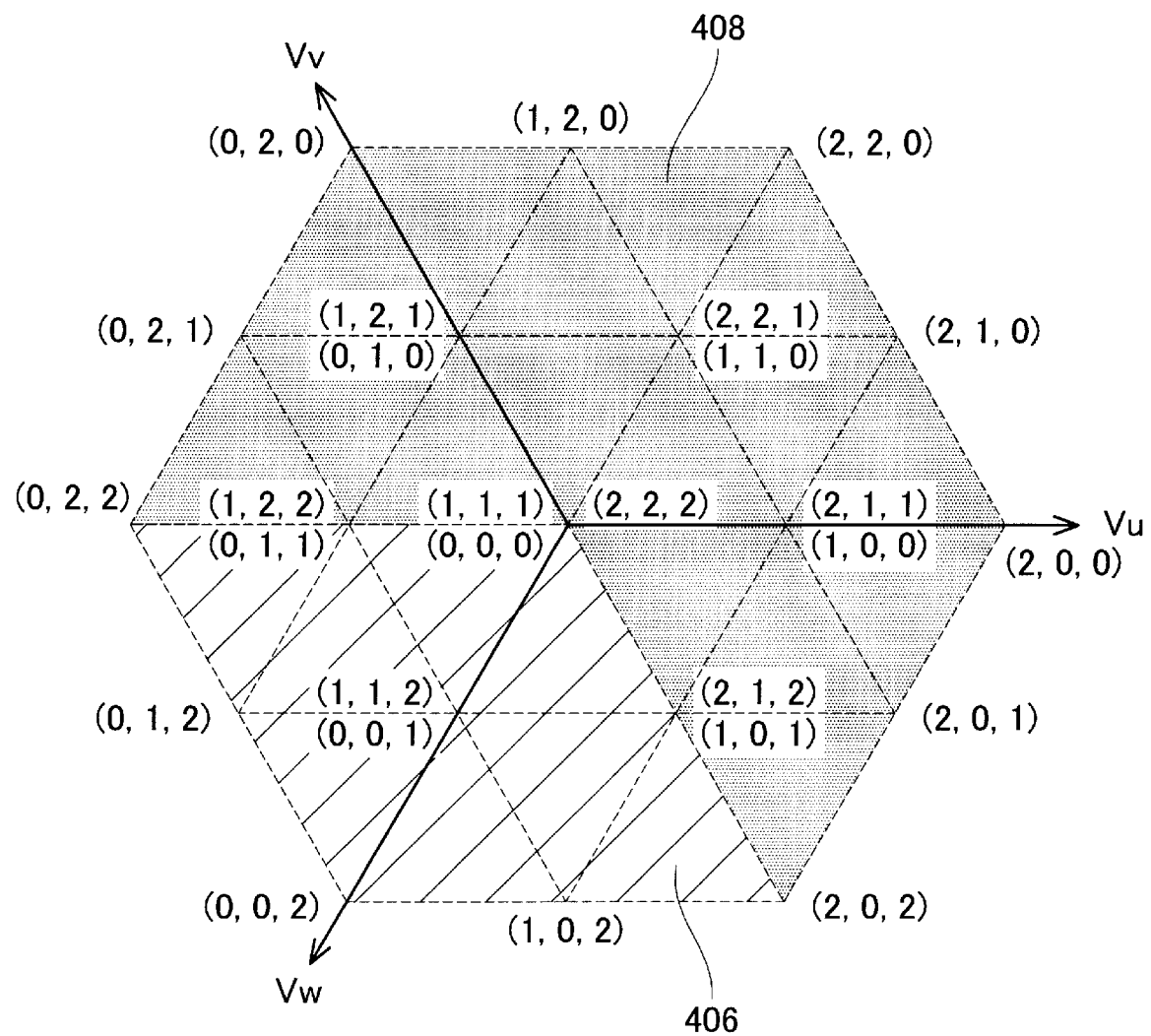
FIG. 21 is a space vector diagram illustrating an example of the limited angular range when the inhibiting potential is the potential VH.

Under any of the fifth to eighth rules, the control circuit 70 determines whether the angle θ of the received command value vector is within a limited angular range or a normal angular range. FIG. 21 illustrates a limited angular range 406 and a normal angular range 408 when the inhibiting potential is the potential VH. In FIG. 21, as an example, a case where the W-phase output wiring 60w is the limit output wiring 60x is illustrated. In FIG. 21, voltage vectors having Vw of 2 (i.e., (2, 2, 2), (1, 2, 2), (1, 1, 2), (2, 1, 2), (0, 2, 2), (0, 1, 2), (0, 0, 2), (1, 0, 2), and (2, 0, 2)) are inhibiting vectors. The range of the angle θ in which these inhibiting vectors are present is a limited angular range 406. In FIG. 21, the angular range 180° 0 300° is the limited angular range 406. In FIG. 21, allowable vectors are (1, 1, 1), (0, 0, 0), (0, 1, 1), (0, 0, 1), and (1, 0, 1).

Furthermore, under any of the fifth to eighth rules, the control circuit 70 determines whether a current flows to the traction motor 90 in the forward direction or the reverse direction, based on the current flowing to the limit output wiring 60x.

(C-1. Sixth Rule)

Under the sixth rule, the control circuit 70 selects a specific voltage vector according to table 6 in FIG. 22, depending on the angle θ of the received command value vector and the direction of a current flowing to the limit output wiring 60x.

As shown in table 6 in FIG. 22, if the angle θ of the command value vector is within the limited angular range, the control circuit 70 selects an allowable vector as the specific voltage vector regardless of the direction of the current flowing to the limit output wiring 60x. The control circuit 70 selects, as the specific voltage vector, an allowable vector having the same angle θ as the angle θ of the command value vector. Then, the control circuit 70 controls potentials of the three output wirings 60 in accordance with the specific voltage vector. Thus, if the angle θ of the command value vector is within the limited angular range, the allowable vector having the same angle θ as that of the command value vector is output. Hence, a voltage vector having the same angle θ as that of the command value vector can be output while the inhibiting vector is prevented from being output.

If the inhibiting potential is the potential VH, the allowable vector is necessarily a lower side vector. If the allowable vector (lower side vector) is output when a current flows to the traction motor 90 in the forward direction, the lower side capacitor 20 is discharged, whereby the neutral point potential VM decreases. If the allowable vector (lower side vector) is output when a current flows to the traction motor 90 in the reverse direction, the lower side capacitor 20 is charged, whereby the neutral point potential VM increases.

As shown in table 6 in FIG. 22, if the angle θ of the command value vector is within the normal angular range, the control circuit 70 selects a specific voltage vector depending on the direction in which a current flows to the limit output wiring 60x. If a current flows to the traction motor 90 in the forward direction, the control circuit 70 selects, as the specific voltage vector, a lower side vector having the same angle θ as the angle θ of the command value vector. If a current flows to the traction motor 90 in the reverse direction, the control circuit 70 selects, as the specific voltage vector, an upper side vector having the same angle θ as the angle θ of the command value vector. The control circuit 70 controls potentials of the three output wirings 60 in accordance with the specific voltage vector.

Thus, in the normal angular range, a lower side vector is output when a current flows in the forward direction, and an upper side vector is output when a current flows in the reverse direction. If a lower side vector is output when a current flows in the forward direction, the lower side capacitor 22 is discharged, whereby the neutral point potential VM decreases (e.g., refer to FIG. 9). If an upper side vector is output when a current flows in the reverse direction, the upper side capacitor 22 is charged, whereby the neutral point potential VM decreases (e.g., refer to FIG. 8). Thus, under the sixth rule, in the normal angular range, a voltage vector by which the neutral point potential VM decreases is selected.

As described above, under the sixth rule, in the limited angular range, the control circuit 70 outputs an allowable vector. When an allowable vector is output, the neutral point potential VM increases or decreases. In addition, under the sixth rule, in the normal angular range, the control circuit 70 outputs a voltage vector that decreases the neutral point potential VM. Hence, the neutral point potential VM tends to decrease over the period during which the sixth rule is employed. As described above, the sixth rule is employed when the neutral point potential VM is higher than the reference value Vt2 (control target value). Employing the sixth rule can restore the neutral point potential VM higher than the reference value Vt2 to a value close to the reference value Vt2.

(C-2. Seventh Rule)

Under the seventh rule, the control circuit 70 selects a specific voltage vector according to table 7 in FIG. 22, depending on the angle θ of the received command value vector and the direction of a current flowing to the limit output wiring 60x.

vector is within the limited angular range, the control circuit 70 selects an allowable vector as the specific voltage vector regardless of the direction of the current flowing to the limit output wiring 60x. The control circuit 70 selects, as the specific voltage vector, an allowable vector having the same angle θ as the angle θ of the command value vector. That is, the seventh rule in the limited angular range is equal to the sixth rule in the limited angular range. Thus, if the angle θ of the command value vector is within the limited angular range, the allowable vector having the same angle θ as that of the command value vector is output. Hence, a voltage vector having the same angle as that of the command value vector can be output while the inhibiting vector is prevented from being output.

If the allowable vector (lower side vector) is output when a current flows to the traction motor 90 in the forward direction, the lower side capacitor 20 is discharged, whereby the neutral point potential VM decreases. If the allowable vector (lower side vector) is output when a current flows to the traction motor 90 in the reverse direction, the lower side capacitor 20 is charged, whereby the neutral point potential VM increases.

As shown in table 7 in FIG. 22, if the angle θ of the command value vector is within the normal angular range, the control circuit 70 selects a specific voltage vector depending on the direction in which a current flows to the limit output wiring 60x. If a current flows to the traction motor 90 in the forward direction, the control circuit 70 selects, as the specific voltage vector, an upper side vector having the same angle θ as the angle θ of the command value vector. If a current flows to the traction motor 90 in the reverse direction, the control circuit 70 selects, as the specific voltage vector, a lower side vector having the same angle θ as the angle θ of the command value vector. The control circuit 70 controls potentials of the three output wirings 60 in accordance with the specific voltage vector.

Thus, in the normal angular range, an upper side vector is output when a current flows in the forward direction, and a lower side vector is output when a current flows in the reverse direction. If an upper side vector is output when a current flows in the forward direction, the upper side capacitor 20 is discharged, whereby the neutral point potential VM increases (e.g., refer to FIG. 7). If a lower side vector is output when a current flows in the reverse direction, the lower side capacitor 22 is charged, whereby the neutral point potential VM increases (e.g., refer to FIG. 10). Thus, under the seventh rule, in the normal angular range, a voltage vector by which the neutral point potential VM increases is selected.

As described above, under the seventh rule, in the limited angular range, the control circuit 70 outputs an allowable vector. When an allowable vector is output, the neutral point potential VM increases or decreases. In addition, under the seventh rule, in the normal angular range, the control circuit 70 outputs a voltage vector that increases the neutral point potential VM. Hence, the neutral point potential VM tends to increase over the period during which the seventh rule is employed. As described above, the seventh rule is employed when the neutral point potential VM is lower than the reference value Vt2 (control target value). Employing the seventh rule can restore the neutral point potential VM lower than the reference value Vt2 to a value close to the reference value Vt2.

(C-3. Fifth Rule)

Under the fifth rule, the control circuit 70 selects a specific voltage vector according to table 5 in FIG. 22, depending on the angle θ of the command value vector and the direction of a current flowing to the limit output wiring 60x.

As is clear from a comparison between table 5 and table 6 in FIG. 22, when a current flows to the traction motor 90 in the reverse direction, and the angle θ of the command value vector is within the limited angular range, the fifth rule (table 5) and the sixth rule (table 6) are different from each other. In other cases, the fifth rule (table 5) and the sixth rule (table 6) are equal to each other.

Under the fifth rule, when a current flows to the traction motor 90 in the reverse direction, and the angle θ of the command value vector is within the limited angular range, the control circuit 70 selects a zero vector as a specific voltage vector. Here, the control circuit 70 selects, as a specific voltage vector, a zero vector (i.e., (0, 0, 0) or (1, 1, 1)) that does not include the inhibiting potential (potential VH). The control circuit 70 outputs the specific voltage vector (i.e., zero vector).

As described above regarding the sixth rule, in the limited angular range, if the allowable vector is output when a current flows in the reverse direction, the neutral point potential VM increases. The fifth rule is employed when the neutral point potential VM is extremely high (i.e., the neutral point potential VM is higher than the upper limit value Vt1). Thus, when the neutral point potential VM is extremely high, it is preferable to decrease the neutral point potential VM as quickly as possible. Hence, at the timing at which the neutral point potential VM increases if the allowable vector is output (i.e., the timing at which a current flows in the reverse direction), the control circuit 70 stops outputting the allowable vector and outputs a zero vector. Thus, under the fifth rule, the neutral point potential VM can be decreased more quickly than that under the sixth rule, whereby the neutral point potential VM can be restored to a value close to the reference value Vt2 more quickly. Hence, under the fifth rule that is employed when the neutral point potential VM is extremely increased, the neutral point potential VM is controlled to an appropriate value while decreasing the neutral point potential VM is in preference to power supply to the traction motor 90.

(C-4. Eighth Rule)

Under the eighth rule, the control circuit 70 selects a specific voltage vector according to table 8 in FIG. 22, depending on the angle θ of the command value vector and the direction of a current flowing to the limit output wiring 60x.

As is clear from a comparison between table 8 and table 7 in FIG. 22, when a current flows to the traction motor 90 in the forward direction, and the angle θ of the command value vector is within the limited angular range, the eighth rule (table 8) and the seventh rule (table 7) are different from each other. In other cases, the eighth rule (table 8) and the seventh rule (table 7) are equal to each other.

Under the eighth rule, when a current flows to the traction motor 90 in the forward direction, and the angle θ of the command value vector is within the limited angular range, the control circuit 70 selects a zero vector as a specific voltage vector. Here, the control circuit 70 selects, as a specific voltage vector, a zero vector (i.e., (0, 0, 0) or (1, 1, 1)) that does not include the inhibiting potential (potential VH). The control circuit 70 outputs the specific voltage vector (i.e., zero vector).

As described above regarding the seventh rule, when the inhibiting potential is the potential VH, if the allowable vector is output when a current flows in the forward direction, the neutral point potential VM decreases. The eighth rule is employed when the neutral point potential VM is extremely low (i.e., the neutral point potential VM is lower than the lower limit value Vt3). Thus, when the neutral point potential VM is extremely low, it is preferable to increase the neutral point potential VM as quickly as possible. Hence, at the timing at which the neutral point potential VM decreases if the allowable vector is output (i.e., the timing at which a current flows in the forward direction), the control circuit 70 stops outputting the allowable vector and outputs a zero vector. Thus, under the eighth rule, the neutral point potential VM can be increased more quickly than that under the seventh rule, whereby the neutral point potential VM can be restored to a value close to the reference value Vt2 more quickly. Hence, under the eighth rule that is employed when the neutral point potential VM is extremely decreased, the neutral point potential VM is controlled to an appropriate value while increasing the neutral point potential VM is in preference to power supply to the traction motor 90.

As described above, when the inhibiting potential is the neutral point potential VM, the fifth to eighth rules are employed depending on the neutral point potential VM, whereby a voltage vector is output so as to rotate while the neutral point potential VM is controlled to a value in the vicinity of the reference value Vt2. Hence, a three-phase AC current can be continuously generated to drive the traction motor 90 continuously.

In the emergency operation when the inhibiting potential is the potential VH, a specific voltage vector is selected in accordance with the fifth to eighth rules to control the potential of the limit output wiring 60x in two levels of the neutral point potential VM and 0V and control the potentials of the two normal switching circuits 60y in three levels of the potential VH, the neutral point potential VM, and 0V.

As in the voltage vector Ea shown in FIG. 4, when the command value vector includes decimal fractions as parameters, the control circuit 70 may select a plurality of specific voltage vectors around the command value vector in accordance with the fifth to eighth rules and output the selected plurality of specific voltage vectors with time differences to synthesize the specific voltage vectors and output a voltage vector having the same angle θ as that of the command value vector.

In the above first embodiment, cases are described where a current flows to the traction motor 90 in the forward direction or the reverse direction. However, during operation, a current may follow to some of the output wirings 60, and a current may follow to the other of the output wirings 60 in the reverse direction. Even in such a case, the control circuit 70 can appropriately select and output a voltage vector that increases the neutral point potential VM or a voltage vector that decreases the neutral point potential VM depending on the direction and the amplitude of currents following to the output wirings 60, to control the neutral point potential VM to a value close to the reference value Vt2.

Second Embodiment

An inverter of a second embodiment differs from the first embodiment in the emergency operation when the inhibiting potential is the potential VH or 0V. More specifically, the inverter of the second embodiment differs from that of the first embodiment in the operation of the control circuit 70 when the angle θ of the command value vector is within the normal angular range. The operations of the control circuit 70 when the angle θ of the command value vector is within the limited angular range in the second embodiment and the first embodiment are equal to each other.

Figure 23:
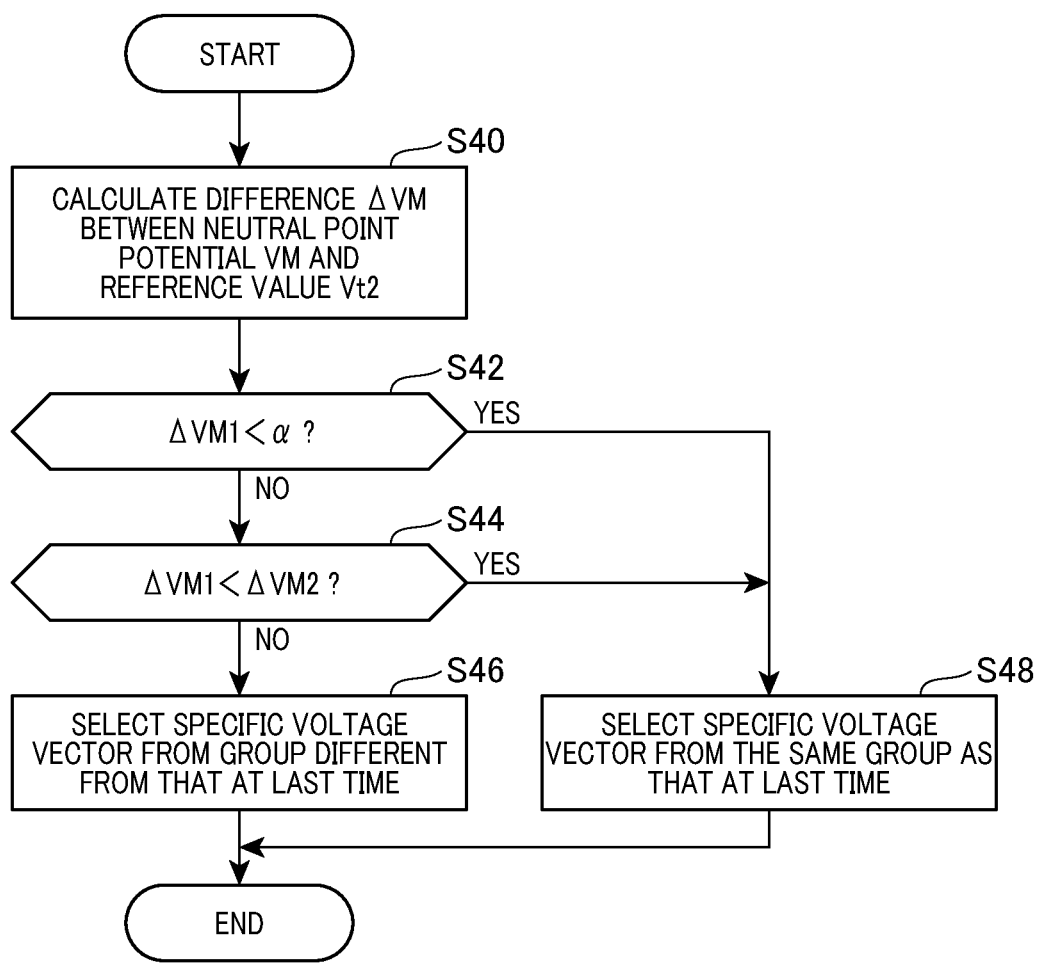
FIG. 23 is a flowchart of a process performed by an inverter of a second embodiment.

In the second embodiment, the operation of the control circuit 70 when the angle θ of the command value vector is within the normal angular range is common to the first to eight rules. In the second embodiment, the control circuit 70 selects any of the group of upper side vectors and the group of lower side vectors and selects a voltage vector having the angle θ equal to that of the command value vector from the selected group to output the selected voltage vector. FIG. 23 illustrates an operation of the control circuit 70 when the angle θ of the command value vector is within the normal angular range. The control circuit 70 repeatedly performs the process shown in FIG. 23. In step S40, the control circuit 70 detects the neutral point potential VM and calculates a difference ΔVM between the neutral point potential VM and the reference value Vt2 (control target value). The difference ΔVM is calculated as an absolute value. The control circuit 70 stores the calculated difference ΔVM. After the difference ΔVM is calculated, steps S42 to S48 are performed. As a result of the performance in steps S42 to S48, the neutral point potential VM changes. In step S40 of the next control phase, the difference ΔVM is calculated again. Hereinafter, the difference ΔVM calculated in the current control phase is referred to as a difference ΔVM1, and the difference ΔVM calculated in the last (previous) control phase is referred to as a difference ΔVM2. In step S42, the control circuit 70 determines whether the difference ΔVM1 calculated in the current control phase is not more than an allowable value α. If the determination is positive (YES) in step S42, in step S48, the control circuit 70 selects, as a specific voltage vector, a voltage vector having the same angle θ as that of the command value vector from the same group as that including the voltage vector output in the last control phase (i.e., any one of the group of upper side vectors and the group of lower side vectors) and outputs the specific voltage vector. In step S42, if the determination is negative (NO), in step S44, the control circuit 70 determines whether the difference ΔVM1 calculated in the current control phase is not more than the difference ΔVM2 calculated in the last control phase. That is, the control circuit 70 determines whether the neutral point potential VM is close to the reference value Vt2 (control target value) compared with that in the last control phase. If the determination is positive (YES) in step S44, step S48 is performed. If the determination is negative (NO) in step S44, in step S46, the control circuit 70 selects, as a specific voltage vector, a voltage vector having the same angle θ as that of the command value vector from the group different from that including the voltage vector output in the last control phase (i.e., any one of the group of upper side vectors and the group of lower side vectors) and outputs the specific voltage vector.

In the second embodiment, if the neutral point potential VM is deviated from the reference value Vt2 by equal to or more than the allowable value α, a voltage vector is selected so that the difference ΔVM decreases. Hence, the neutral point potential VM can be prevented from being largely deviated from the reference value Vt2. According to the second embodiment, regardless of the detection value of a current of the output wiring 60, a voltage vector can be appropriately output. According to the configuration of the second embodiment, even when a speed of detection a current is not sufficient with respect to the control speed, the neutral point potential VM can be controlled to an appropriate value.

When an emergency operation is performed, a three-phase AC current may be generated while the neutral point potential VM is controlled, by using configurations other than those of the first and second embodiments. Controlling the potential of the limit output wiring in two levels excluding the inhibiting potential and controlling the potential of the normal output wiring in three levels of the potential VH, the neutral point potential VM, and 0V can appropriately control the neutral point potential VM even if a voltage vector is output under a rule other than those in the first and second embodiments. For example, in part of the normal angular range, a voltage vector configured by only value 0 and value 2 or a voltage vector including all of value 0, value 1, and value 2 may be output.

In the above first and second embodiments, the command circuit 72 outputs a command value vector to the control circuit 70. However, the command circuit 72 may output only a command value of the angle θ of a voltage vector to the control circuit 70.

The embodiments described above in detail are examples and do not limit the claims. The techniques described in the claims include various modifications of the specific examples described above. Technical elements described herein and in the drawings provide availability by themselves or various combinations thereof, and are not limited to combinations of the claims. In addition, the techniques exemplified herein and in the drawings achieve a plurality of objects simultaneously and have availability provided by achievement of one of the objects.

An aspect of the present disclosure provides an inverter (hereinafter, it may be referred to as a first inverter), including: a high potential wiring to which a high potential is applied; a low potential wiring to which a low potential is applied; a neutral point; an upper side capacitor connected between the high potential wiring and the neutral point; a lower side capacitor connected between the neutral point and the low potential wiring; and three switching circuits including a U-phase switching circuit, a V-phase switching circuit, and a W-phase switching circuit.

Each of the three switching circuits includes: an output wiring; a first switching element having a positive electrode connected to the high potential wiring; a second switching element having a positive electrode connected to a negative electrode of the first switching element and a negative electrode connected to the output wiring; a third switching element having a positive electrode connected to the output wiring; a fourth switching element having a positive electrode connected to a negative electrode of the third switching element and a negative electrode connected to the low potential wiring; a first diode having an anode connected to the neutral point and a cathode connected to the negative electrode of the first switching element; and a second diode having an anode connected to the negative electrode of the third switching element and a cathode connected to the neutral point.

The inverter further includes a control circuit controlling potentials of gates of the first switching element, the second switching element, the third switching element, and the fourth switching element of the three switching circuits.

The control circuit causes the three switching circuits to change among a first state in which the first switching element and the second switching element are turned on to apply the high potential to the corresponding output wiring, a second state in which the second switching element and the third switching element are turned on to apply a neutral point potential, which is a potential of the neutral point, to the corresponding output wiring, and a third state in which the third switching element and the fourth switching element are turned on to apply the low potential to the corresponding output wiring.

The control circuit causes respective potentials of a U-phase output wiring that is the output wiring of the U-phase switching circuit, a V-phase output wiring that is the output wiring of the V-phase switching circuit, and a W-phase output wiring that is the output wiring of the W-phase switching circuit to change among the high potential, the neutral point potential, and the low potential, to generate a three-phase AC current among the U-phase output wiring, the V-phase output wiring, and the W-phase output wiring.

The control circuit is capable of performing an emergency operation when any of the second switching elements, the third switching elements, the first diodes, and the second diodes of the three switching circuits has caused a short fault.

The element having caused a short fault is a short fault element.

The output wiring of one of the three switching elements which includes the short fault element is a limit output wiring.

Each of the output wirings of two of the three switching elements which do not include the short fault element is a normal output wiring.

In the emergency operation, the control circuit causes a potential of the limit output wiring to change between two potentials that are included in a group including the high potential, the neutral point potential, and the low potential and are not inhibiting potentials, and causes potentials of the respective normal output wirings to change among three potentials that are included in the group including the high potential, the neutral point potential, and the low potential.

When the short fault element is the second switching element or the second diode, the inhibiting potential is the low potential.

When the short fault element is the third switching element or the first diode, the inhibiting potential is the high potential.

In the inverter, when an emergency operation is performed, a potential of the output wiring (limit output wiring) of the switching circuit including a short fault element is changed between two potentials that are not inhibiting potentials, while a potential of the normal output wiring is changed between three potentials. That is, the limit output wiring is controlled in two levels, while the normal output wiring is controlled in three levels. When the normal output wiring is controlled in three levels, since any one of the upper side capacitor and the lower side capacitor is not forcibly discharged, the neutral point potential is prevented from being excessively increased or decreased. Hence, according to the inverter, even when the second switching element, the third switching element, the first diode, or the second diode has caused a short fault, a three-phase AC current can be continuously generated.

The inverter may further include a command circuit that generates a command value of an angle of a voltage vector so that the voltage vector rotates, and outputs the command value to the control circuit.

The voltage vector may be represented by parameters Vu, Vv, Vw.

The parameter Vu may indicate whether a potential of the U-phase output wiring is the high potential, the neutral point potential, or the low potential.

The parameter Vv may indicate whether a potential of the V-phase output wiring is the high potential, the neutral point potential, or the low potential.

The parameter Vw may indicate whether a potential of the W-phase output wiring is the high potential, the neutral point potential, or the low potential.

In the emergency operation, the voltage vector by which the limit output wiring becomes the inhibiting potential may be an inhibiting vector, an angular range, which is included in an angular range of the voltage vector and in which the inhibiting vector is included, may be a limited angular range, and an angular range, which is included in the angular range of the voltage vector and is outside the limited angular range, may be a normal angular range.

In the emergency operation, if the angle indicated by the command value is within the limited angular range, the control circuit controls potentials of the three output wirings in accordance with an allowable vector that has the angle indicated by the command value and is not the inhibiting vector.

In the emergency operation, if the angle indicated by the command value is within the normal angular range, the control circuit may select a specific voltage vector from the plurality of voltage vectors having the angle indicated by the command value and controls potentials of the three output wirings in accordance with the selected specific voltage vector.

If the neutral point potential is lower than a reference value, the control circuit may selects, as the specific voltage vector, the voltage vector that increases the neutral point potential.

If the neutral point potential is higher than the reference value, the control circuit may select, as the specific voltage vector, the voltage vector that decreases the neutral point potential.

In the inverter in three levels, output voltage may be represented by a voltage level. In this case, a plurality of voltage vectors having the same angle are present. For example, as voltage vectors (Vu, Vv, Vw) having an angle of 60° with respect to the U phase include (2, 2, 0), (2, 2, 1), (1, 1, 0). As the parameters Vu, Vv, Vw, value 2 means a high potential, value 1 means a neutral point potential, and value 0 means a low potential.

If an angle indicated by a command value is within the limited angular range, the control circuit controls a potential of the output wiring in accordance with an allowable vector (a voltage vector other than the inhibiting vector) included in a plurality of voltage vectors having the angle. For example, when the high potential is the inhibiting potential, (2, 2, 0), (2, 2, 1) included in the above (2, 2, 0), (2, 2, 1), (1, 1, 0) are inhibiting vector. In this case, since (1, 1, 0) is the allowable vector (available voltage vector), the control circuit controls potentials of the output wirings in accordance with (1, 1, 0). Thus, if an angle indicated by a command value is within the limited angular range, the control circuit performs control in accordance with an allowable vector to inhibit the use of the inhibiting potential.

If an angular range indicated by a command value is within the normal angular range, the control circuit selects a specific voltage vector from a plurality of voltage vectors having the angle and controls a potential of the output wiring in accordance with the selected specific voltage vector. If the neutral point potential is lower than a reference value, the control circuit selects, as the specific voltage vector, the voltage vector that increases the neutral point potential. If the neutral point potential is higher than the reference value, the control circuit selects, as the specific voltage vector, the voltage vector that decreases the neutral point potential. For example, if the angle (i.e., 60°) of the above (2, 2, 0), (2, 2, 1), (1, 1, 0) is within the normal angular range, the control circuit selects a specific voltage vector from these voltage vectors. Among the voltage vectors, (2, 2, 1), (1, 1, 0) are voltage vectors by which the neutral point potential is changed. The control circuit selects (2, 2, 1) or (1, 1, 0) depending on the operating state of the inverter and makes the neutral point potential close to the reference value. Thus, since a plurality of available voltage vectors are present if an angular range indicated by a command value is within the normal angular range, selecting an appropriate voltage vector from the plurality of available voltage vectors can control the neutral point potential to an appropriate value. Hence, a three-phase AC current can be continuously generated.

In the inverter, the three output wirings may be connected to a load.

The voltage vector by which the high potential and the neutral point potential may be applied to the load and the low potential is not applied to the load is an upper side vector.

The voltage vector by which the neutral point potential and the low potential may be applied to the load and the high potential is not applied to the load is a lower side vector.

If the angle indicated by the command value is within the normal angular range, the control circuit may select the specific voltage vector in accordance with the following conditions A to D:

- A: if the neutral point potential is lower than the reference value and a current flows to the load in the forward direction with respect to a voltage applied to the load, the upper side vector is selected as the specific voltage vector;
- B: if the neutral point potential is lower than the reference value and a current flows to the load in the reverse direction with respect to the voltage applied to the load, the lower side vector is selected as the specific voltage vector;
- C: if the neutral point potential is higher than the reference value and a current flows to the load in the forward direction with respect to the voltage applied to the load, the lower side vector is selected as the specific voltage vector;
- D: if the neutral point potential is higher than the reference value and a current flows to the load in the reverse direction with respect to the voltage applied to the load, the upper side vector is selected as the specific voltage vector.

According to the configuration, change in the neutral point potential can be further suppressed.

In the inverter, if the neutral point potential is higher than an upper limit value higher than the reference value, the angle indicated by the command value is within the limited angular range, and the allowable vector is the voltage vector that increases the neutral point potential, the control circuit may control the three output wirings to the same potential regardless of the angle indicated by the command value. If the neutral point potential is lower than a lower limit value lower than the reference value, the angle indicated by the command value is within the limited angular range, and the allowable vector is the voltage vector that decreases the neutral point potential, the control circuit may control the three output wirings to the same potential regardless of the angle indicated by the command value.

Thus, if the difference between the neutral point potential and the reference value is large, controlling the output wirings to the same potential under the above conditions can quickly restore the neutral point potential to a value close to the reference value.

The inverter may further include a command circuit that generates a command value of an angle of a voltage vector so that the voltage vector rotates, and outputs the command value to the control circuit.

The voltage vector may be represented by parameters Vu, Vv, Vw.

The parameter Vu may indicate whether a potential of the U-phase output wiring is the high potential, the neutral point potential, or the low potential.

The parameter Vv may indicate whether a potential of the V-phase output wiring is the high potential, the neutral point potential, or the low potential.

The parameter Vw may indicate whether a potential of the W-phase output wiring is the high potential, the neutral point potential, or the low potential.

In the emergency operation, the voltage vector by which the limit output wiring becomes the inhibiting potential may be an inhibiting vector, an angular range, which is included in an angular range of the voltage vector and in which the inhibiting vector is included, may be a limited angular range, and an angular range, which is included in the angular range of the voltage vector and is outside the limited angular range, may be a normal angular range.

In the emergency operation, if the angle indicated by the command value is within the limited angular range, the control circuit may control potentials of the three output wirings in accordance with an allowable vector that has the angle indicated by the command value and is not the inhibiting vector.

In the emergency operation, if the angle indicated by the command value is within the normal angular range, the control circuit may select a specific voltage vector from the plurality of voltage vectors having the angle indicated by the command value and control potentials of the three output wirings in accordance with the selected specific voltage vector.

The three output wirings may be connected to a load.

The specific voltage vector may be selected from a first group including the voltage vectors by which the high potential and the neutral point potential are applied to the load and the low potential is not applied to the load and a second group including the voltage vectors by which the neutral point potential and the low potential are applied to the load and the high potential is not applied to the load.

The control circuit may store a control target value of the neutral point potential.

If a difference between the neutral point potential and the control target value is increased after a last control phase, the control circuit may select the specific voltage vector from one of the first group and the second group different from the other of the first group and the second group in which the voltage vector selected in the last control phase is included.

Also according to the configuration, controlling the neutral point potential to an appropriate value can continuously generate a three-phase AC current.

In the inverter, the control circuit may detect currents flowing to the first switching element, the second switching element, the third switching element, and the fourth switching element of the three switching circuits.

The control circuit may be capable of performing a short-circuit element determination operation for a selected switching circuit selected from the three switching circuits.

In the short-circuit element determination operation, the control circuit may cause the selected switching circuit to change with time among the first state, the second state, and the third state.

For the selected switching circuit, when a short-circuit current flows to the first switching element and a short-circuit current does not flow to the second switching element in the first state, the control circuit may determine that the first diode is the short fault element.

When a short-circuit current flows to the first switching element and the second switching element in the first state, the control circuit may determine that the third switching circuit is the short fault element. When a short-circuit current flows to the second switching element and the third switching element and the neutral point potential increases in the second state, the control circuit may determine that the first switching circuit is the short fault element.

When a short-circuit current flows to the second switching element and the third switching element and the neutral point potential decreases in the second state, the control circuit may determine that the fourth switching circuit is the short fault element.

When a short-circuit current flows to the third switching element and the fourth switching element in the third state, the control circuit may determine that the second switching circuit is the short fault element.

When a short-circuit current flows to the fourth switching element and a short-circuit current does not flow to the third switching element in the third state, the control circuit may determine that the second diode is the short fault element.

The number of the selected switching circuits may be one, two, or three. That is, the short-circuit element determination operation may be simultaneously performed for the two or three selected switching circuits.

According to the configuration, a short-circuit element can be specified.

What is claimed is:

1. An inverter, comprising:
a high potential wiring to which a high potential is applied;
a low potential wiring to which a low potential is applied;
a neutral point;
an upper side capacitor connected between the high potential wiring and the neutral point;
a lower side capacitor connected between the neutral point and the low potential wiring; and
three switching circuits including a U-phase switching circuit, a V-phase switching circuit, and a W-phase switching circuit, wherein
each of the three switching circuits includes:
an output wiring;
a first switching element having a positive electrode connected to the high potential wiring;
a second switching element having a positive electrode connected to a negative electrode of the first switching element and a negative electrode connected to the output wiring;
a third switching element having a positive electrode connected to the output wiring;
a fourth switching element having a positive electrode connected to a negative electrode of the third switching element and a negative electrode connected to the low potential wiring;
a first diode having an anode connected to the neutral point and a cathode connected to the negative electrode of the first switching element; and
a second diode having an anode connected to the negative electrode of the third switching element and a cathode connected to the neutral point,
the inverter further comprises a control circuit controlling potentials of gates of the first switching element, the second switching element, the third switching element, and the fourth switching element of the three switching circuits,
the control circuit causes the three switching circuits to change among a first state in which the first switching element and the second switching element are turned on to apply the high potential to the corresponding output wiring, a second state in which the second switching element and the third switching element are turned on to apply a neutral point potential, which is a potential of the neutral point, to the corresponding output wiring, and a third state in which the third switching element and the fourth switching element are turned on to apply the low potential to the corresponding output wiring,
the control circuit causes respective potentials of a U-phase output wiring that is the output wiring of the U-phase switching circuit, a V-phase output wiring that is the output wiring of the V-phase switching circuit, and a W-phase output wiring that is the output wiring of the W-phase switching circuit to change among the high potential, the neutral point potential, and the low potential, to generate a three-phase AC current among the U-phase output wiring, the V-phase output wiring, and the W-phase output wiring,
the control circuit is capable of performing an emergency operation when any of the second switching elements, the third switching elements, the first diodes, and the second diodes of the three switching circuits has caused a short fault,
the element having caused the short fault is a short fault element,
the output wiring of one of the three switching elements which includes the short fault element is a limit output wiring,
each of the output wirings of two of the three switching elements which do not include the short fault element is a normal output wiring,
in the emergency operation, the control circuit causes a potential of the limit output wiring to change between two potentials that are included in a group including the high potential, the neutral point potential, and the low potential and are not inhibiting potentials, and causes potentials of the respective normal output wirings to change among three potentials that are included in the group including the high potential, the neutral point potential, and the low potential,
when the short fault element is the second switching element or the second diode, the inhibiting potential is the low potential, and
when the short fault element is the third switching element or the first diode, the inhibiting potential is the high potential.

2. The inverter according to claim 1, further comprising a command circuit that generates a command value of an angle of a voltage vector so that the voltage vector rotates, and outputs the command value to the control circuit, wherein
- the voltage vector is represented by parameters Vu, Vv, Vw,
- the parameter Vu indicates whether a potential of the U-phase output wiring is the high potential, the neutral point potential, or the low potential,
- the parameter Vv indicates whether a potential of the V-phase output wiring is the high potential, the neutral point potential, or the low potential,
- the parameter Vw indicates whether a potential of the W-phase output wiring is the high potential, the neutral point potential, or the low potential,
- in the emergency operation, the voltage vector by which the limit output wiring becomes the inhibiting potential is an inhibiting vector, an angular range, which is included in an angular range of the voltage vector and in which the inhibiting vector is included, is a limited angular range, and an angular range, which is included in the angular range of the voltage vector and is outside the limited angular range, is a normal angular range,
- in the emergency operation, if the angle indicated by the command value is within the limited angular range, the control circuit controls potentials of the three output wirings in accordance with an allowable vector that has the angle indicated by the command value and is not the inhibiting vector,
- in the emergency operation, if the angle indicated by the command value is within the normal angular range, the control circuit selects a specific voltage vector from the plurality of voltage vectors having the angle indicated by the command value and controls potentials of the three output wirings in accordance with the selected specific voltage vector,
- if the neutral point potential is lower than a reference value, the control circuit selects, as the specific voltage vector, the voltage vector that increases the neutral point potential, and
- if the neutral point potential is higher than the reference value, the control circuit selects, as the specific voltage vector, the voltage vector that decreases the neutral point potential.

3. The inverter according to claim 2, wherein
- the three output wirings are connected to a load,
- the voltage vector by which the high potential and the neutral point potential are applied to the load and the low potential is not applied to the load is an upper side vector,
- the voltage vector by which the neutral point potential and the low potential are applied to the load and the high potential is not applied to the load is a lower side vector, and
- if the angle indicated by the command value is within the normal angular range, the control circuit selects the specific voltage vector in accordance with the following conditions A to D:
- A: if the neutral point potential is lower than the reference value and a current flows to the load in a forward direction with respect to a voltage applied to the load, the upper side vector is selected as the specific voltage vector;
- B: if the neutral point potential is lower than the reference value and a current flows to the load in a reverse direction with respect to the voltage applied to the load, the lower side vector is selected as the specific voltage vector;
- C: if the neutral point potential is higher than the reference value and a current flows to the load in the forward direction with respect to the voltage applied to the load, the lower side vector is selected as the specific voltage vector;
- D: if the neutral point potential is higher than the reference value and a current flows to the load in the reverse direction with respect to the voltage applied to the load, the upper side vector is selected as the specific voltage vector.

4. The inverter according to claim 3, wherein
if the neutral point potential is higher than an upper limit value higher than the reference value, the angle indicated by the command value is within the limited angular range, and the allowable vector is the voltage vector that increases the neutral point potential, the control circuit controls the three output wirings to the same potential regardless of the angle indicated by the command value.

5. The inverter according to claim 3, wherein
if the neutral point potential is lower than a lower limit value lower than the reference value, the angle indicated by the command value is within the limited angular range, and the allowable vector is the voltage vector that decreases the neutral point potential, the control circuit controls the three output wirings to the same potential regardless of the angle indicated by the command value.

6. The inverter according to claim 1, further comprising a command circuit that generates a command value of an angle of a voltage vector so that the voltage vector rotates, and outputs the command value to the control circuit, wherein
- the voltage vector is represented by parameters Vu, Vv, Vw,
- the parameter Vu indicates whether a potential of the U-phase output wiring is the high potential, the neutral point potential, or the low potential,
- the parameter Vv indicates whether a potential of the V-phase output wiring is the high potential, the neutral point potential, or the low potential,
- the parameter Vw indicates whether a potential of the W-phase output wiring is the high potential, the neutral point potential, or the low potential,
- in the emergency operation, the voltage vector by which the limit output wiring becomes the inhibiting potential is an inhibiting vector, an angular range, which is included in an angular range of the voltage vector and in which the inhibiting vector is included, is a limited angular range, and an angular range, which is included in the angular range of the voltage vector and is outside the limited angular range, is a normal angular range,
- in the emergency operation, if the angle indicated by the command value is within the limited angular range, the control circuit controls potentials of the three output wirings in accordance with an allowable vector that has the angle indicated by the command value and is not the inhibiting vector,
- in the emergency operation, if the angle indicated by the command value is within the normal angular range, the control circuit selects a specific voltage vector from the plurality of voltage vectors having the angle indicated by the command value and controls potentials of the three output wirings in accordance with the selected specific voltage vector, the three output wirings are connected to a load, the specific voltage vector is selected from a first group including the voltage vectors by which the high potential and the neutral point potential are applied to the load and the low potential is not applied to the load and a second group including the voltage vectors by which the neutral point potential and the low potential are applied to the load and the high potential is not applied to the load, the control circuit stores a control target value of the neutral point potential, and if a difference between the neutral point potential and the control target value is increased after a last control phase, the control circuit selects the specific voltage vector from one of the first group and the second group different from the other of the first group and the second group in which the voltage vector selected in the last control phase is included.

7. The inverter according to claim 1, wherein the control circuit detects currents flowing to the first switching element, the second switching element, the third switching element, and the fourth switching element of the three switching circuits, the control circuit is capable of performing a short-circuit element determination operation for a selected switching circuit selected from the three switching circuits, in the short-circuit element determination operation, the control circuit causes the selected switching circuit to change with time among the first state, the second state, and the third state, for the selected switching circuit, when a short-circuit current flows to the first switching element and a short-circuit current does not flow to the second switching element in the first state, the control circuit determines that the first diode is the short fault element, when a short-circuit current flows to the first switching element and the second switching element in the first state, the control circuit determines that the third switching circuit is the short fault element, when a short-circuit current flows to the second switching element and the third switching element and the neutral point potential increases in the second state, the control circuit determines that the first switching circuit is the short fault element, when a short-circuit current flows to the second switching element and the third switching element and the neutral point potential decreases in the second state, the control circuit determines that the fourth switching circuit is the short fault element, when a short-circuit current flows to the third switching element and the fourth switching element in the third state, the control circuit determines that the second switching circuit is the short fault element, and when a short-circuit current flows to the fourth switching element and a short-circuit current does not flow to the third switching element in the third state, the control circuit determines that the second diode is the short fault element.

\* \* \* \* \*